US012116253B2

(12) United States Patent
Kawashima et al.

(10) Patent No.: US 12,116,253 B2
(45) Date of Patent: Oct. 15, 2024

(54) METHOD OF CONTROLLING MOVABLE BODY, MOVABLE BODY AND PROGRAM

(71) Applicant: MITSUBISHI HEAVY INDUSTRIES, LTD., Tokyo (JP)

(72) Inventors: Hiroki Kawashima, Tokyo (JP); Kenji Takao, Tokyo (JP); Katsumasa Kitajima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 325 days.

(21) Appl. No.: 17/688,199

(22) Filed: Mar. 7, 2022

(65) Prior Publication Data
US 2022/0289538 A1 Sep. 15, 2022

(30) Foreign Application Priority Data
Mar. 15, 2021 (JP) ................. 2021-041650

(51) Int. Cl.
*B66F 9/06* (2006.01)
*B66F 9/075* (2006.01)
(Continued)

(52) U.S. Cl.
CPC ............ *B66F 9/063* (2013.01); *B66F 9/0755* (2013.01); *G01S 17/89* (2013.01); *G01S 17/931* (2020.01); *G05D 1/0214* (2013.01); *G05D 1/024* (2013.01)

(58) Field of Classification Search
CPC ...... B66F 17/003; B66F 9/063; B66F 9/0755; G01S 17/875; G01S 17/89; G01S 17/93;
(Continued)

(56) References Cited

U.S. PATENT DOCUMENTS 10,248,123 B2 * 4/2019 Ichinose .............. G05D 1/0225
10,365,657 B2 7/2019 Tokuyama et al.
(Continued)

FOREIGN PATENT DOCUMENTS

CN 110077397 A * 8/2019 ............ B60W 30/09
DE 102020120119 A1 * 2/2021 ............ B66F 9/0755
(Continued)

*Primary Examiner* — Babar Sarwar
(74) *Attorney, Agent, or Firm* — Wenderoth, Lind & Ponack, L.L.P.

(57) ABSTRACT

A method of controlling a movable body includes: a step of causing a sensor provided on the movable body to detect an obstacle; a step of determining the position and attitude of a front surface, of the obstacle, opposite to the travel direction of the movable body based on the detection result of the obstacle; a step of generating an avoidance path that avoids the obstacle while heading toward a side of a first direction intersecting the travel direction based on the position and attitude of the front surface; a step of causing the movable body to move along the avoidance path; a step of detecting the obstacle while the movable body is moving along the avoidance path; a step of determining the position and attitude of the side surface of the obstacle on the side of the first direction based on the detection result obtained during movement along the avoidance path; and a step of updating the avoidance path so as to return to a side of a second direction opposite to the first direction while avoiding the obstacle based on the position and attitude of the side surface.

9 Claims, 21 Drawing Sheets

(51) Int. Cl.
*G01S 17/89* (2020.01)
*G01S 17/931* (2020.01)
*G05D 1/00* (2024.01)

(58) Field of Classification Search
CPC .. G01S 17/931; G05D 1/0212; G05D 1/0214; G05D 1/0238; G05D 1/024
See application file for complete search history.

(56) References Cited

U.S. PATENT DOCUMENTS

| | | | |
|---|---|---|---|
| 10,850,961 B2 | 12/2020 | Tanaka et al. | |
| 2016/0375901 A1* | 12/2016 | Di Cairano | B60W 30/09 701/26 |
| 2017/0017237 A1 | 1/2017 | Tokuyama et al. | |
| 2017/0158236 A1* | 6/2017 | Kim | B62D 6/10 |
| 2017/0285643 A1* | 10/2017 | Ichinose | G05D 1/021 |
| 2018/0059682 A1* | 3/2018 | Thode | B60W 30/095 |
| 2018/0155169 A1* | 6/2018 | Tanaka | G05D 1/0225 |
| 2020/0074196 A1* | 3/2020 | Gui | G06T 7/70 |
| 2020/0331465 A1* | 10/2020 | Herman | G08G 1/161 |
| 2021/0041564 A1* | 2/2021 | Hattori | B66F 9/0755 |
| 2021/0149403 A1* | 5/2021 | Ready-Campbell | G05D 1/0027 |
| 2022/0163969 A1* | 5/2022 | Li | G08G 1/096811 |

FOREIGN PATENT DOCUMENTS

| | | | | |
|---|---|---|---|---|
| JP | 2005-258754 | | 9/2005 | |
| JP | 2014-164424 | | 9/2014 | |
| JP | 2014164424 | A * | 9/2014 | |
| JP | WO2015/151266 | | 10/2015 | |
| JP | 2017-182502 | | 10/2017 | |
| JP | 2021-24728 | | 2/2021 | |
| JP | 2021024728 | A * | 2/2021 | ............ B66F 9/0755 |
| WO | 2014/091611 | | 6/2014 | |
| WO | WO-2014091611 | A1 * | 6/2014 | ........... G05D 1/0246 |
| WO | 2016/181733 | | 11/2016 | |

* cited by examiner

METHOD OF CONTROLLING MOVABLE BODY, MOVABLE BODY AND PROGRAM

CROSS-REFERENCE TO RELATED APPLICATIONS

This application claims the benefit of priority to Japanese Patent Application Number 2021-041650 filed on Mar. 15, 2021. The entire contents of the above-identified application are hereby incorporated by reference.

TECHNICAL FIELD

The disclosure relates to a method of controlling a movable body, a movable body and a program.

RELATED ART

There is a known movable body that moves automatically and that is equipped with a sensor that detects a periphery. For example, JP 2014-164424 A describes detecting an obstacle and generating a local map, the local map including a travelable region where a movable body can travel and an obstacle region where the obstacle is located.

SUMMARY

Such a movable body is required to appropriately avoid an obstacle.

The present disclosure has been made to solve the above-described problem, and an object of thereof is to provide a method of controlling a movable body, a movable body and a program that allows appropriate avoidance of an obstacle.

In order to solve the above problem and achieve the above object, a method of controlling a movable body according to the present disclosure is a method of controlling a movable body that moves automatically and includes: a step of causing a sensor provided on the movable body to detect an obstacle; a step of determining a position and an attitude of a front surface, of the obstacle, opposite to a travel direction of the movable body based on a detection result of the obstacle; a step of generating an avoidance path that avoids the obstacle while heading toward a side of a first direction intersecting the travel direction based on the position and the attitude of the front surface; a step of causing the movable body to move along the avoidance path; a step of detecting the obstacle while the movable body is moving along the avoidance path; a step of determining a position and an attitude of a side surface of the obstacle on the side of the first direction based on a detection result obtained during movement along the avoidance path; and a step of updating the avoidance path to return to a side of a second direction opposite to the first direction while avoiding the obstacle based on the position and the attitude of the side surface.

In order to solve the above problem and achieve the above object, a movable body according to the present disclosure is a movable body that moves automatically and includes: a detection control unit configured to cause a sensor provided on the movable body to detect an obstacle; an avoidance path information acquisition unit configured to acquire information about an avoidance path which is generated based on a position and an attitude of a front surface, of the obstacle, opposite to a travel direction of the movable body determined by a detection result of the obstacle, and which avoids the obstacle while heading toward a side of a first direction intersecting the travel direction; and a movement control unit configured to cause the movable body to move along the avoidance path. The avoidance path is updated to return to a side of a second direction opposite to the first direction while avoiding the obstacle based on a position and an attitude of a side surface of the obstacle on the side of the first direction which are determined from a detection result obtained by the sensor during movement along the avoidance path.

In order to solve the above problem and achieve the above object, a program according to the present disclosure is a program that causes a computer to implement a method of controlling a movable body that moves automatically and causes a computer to perform: a step of causing a sensor provided on the movable body to detect an obstacle; a step of determining a position and an attitude of a front surface, of the obstacle, opposite to a travel direction of the movable body based on a detection result of the obstacle; a step of generating an avoidance path that avoids the obstacle while heading toward a side of a first direction intersecting the travel direction based on the position and the attitude of the front surface; a step of causing the movable body to move along the avoidance path; a step of detecting the obstacle while the movable body is moving along the avoidance path; a step of determining a position and an attitude of a side surface of the obstacle on the side of the first direction based on a detection result obtained during movement along the avoidance path; and a step of updating the avoidance path to return to a side of a second direction opposite to the first direction while avoiding the obstacle based on the position and the attitude of the side surface.

According to the present disclosure, it is possible to appropriately avoid an obstacle.

BRIEF DESCRIPTION OF DRAWINGS

The disclosure will be described with reference to the accompanying drawings, wherein like numbers reference like elements.

DESCRIPTION OF EMBODIMENTS

Preferred embodiments of the disclosure will be described in detail below with reference to the accompanying drawings. Note that the disclosure is not limited to these embodiments, and, when there are a plurality of embodiments, the disclosure is intended to include a configuration combining these embodiments.

First Embodiment

Overall Configuration of Movement Control System

Figure 1:
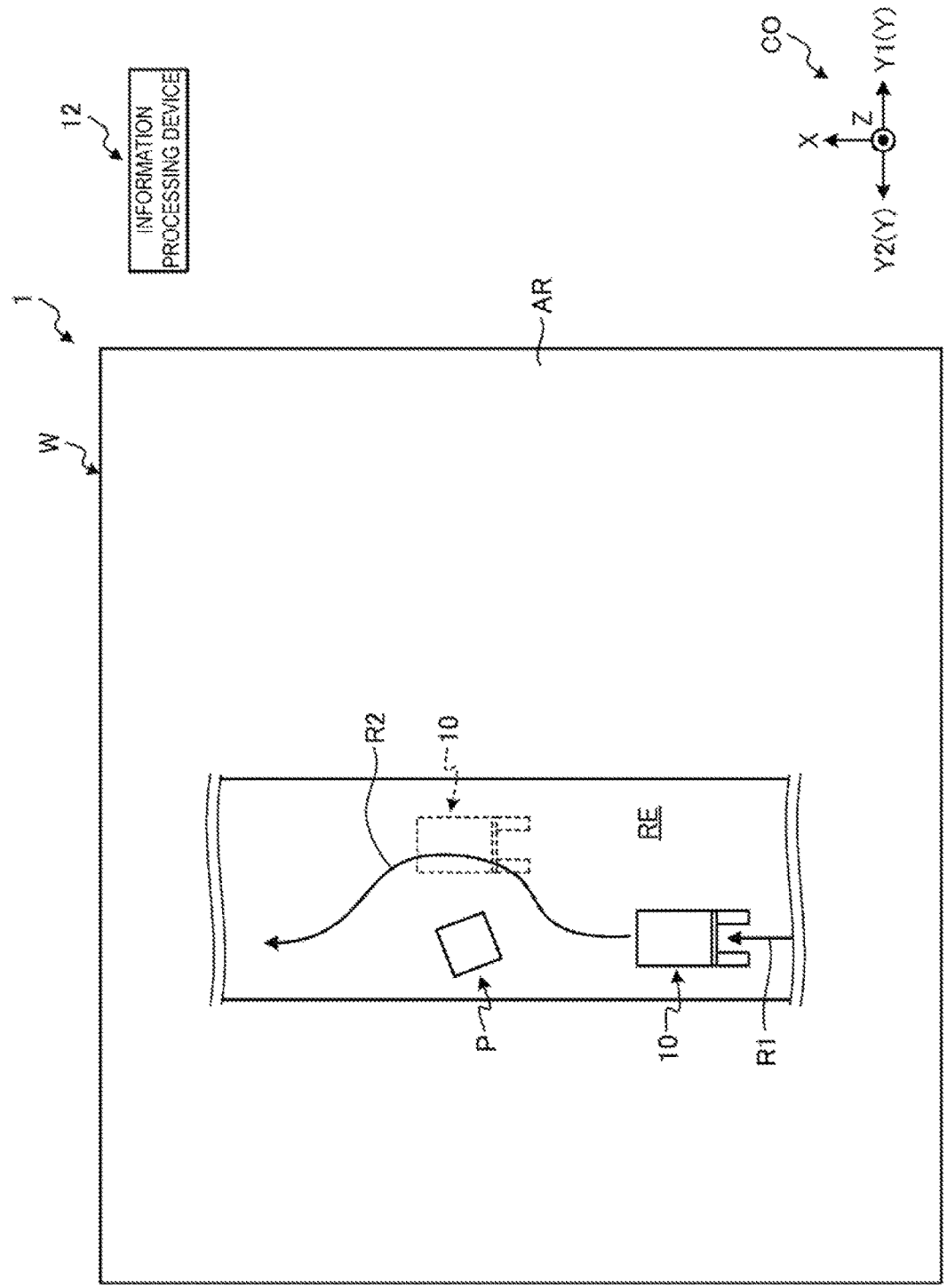
FIG. 1 is a schematic view of a movement control system according to a first embodiment.

FIG. 1 is a schematic view of a movement control system according to a first embodiment. As illustrated in FIG. 1, the movement control system 1 according to the first embodiment includes a movable body 10 and an information processing device 12. The movement control system 1 is a system that controls movement of the movable body 10 belonging to a facility W. The facility W is a facility that is logistically managed, such as a warehouse. The movement control system 1 causes the movable body 10 to move within an area AR of the facility W. The area AR is, for example, a floor surface of the facility W. Hereinafter, one direction along the area AR is referred to as a direction X. Further, a direction along the area AR that intersects the direction X is referred to as a direction Y, one direction along the direction Y is referred to as a direction Y1, and the other direction along the direction Y, that is, a direction opposite to the direction Y1 is referred to as a direction Y2. In the present embodiment, the directions Y1 and Y2 are directions orthogonal to the direction X. The direction X and the directions Y1 and Y2 may be horizontal directions. A direction orthogonal to the direction X and the directions Y1 and Y2, that is, a vertical direction, is referred to as a direction Z.

In the present embodiment, the movable body 10 moves along a movement path R1. However, when an obstacle P is present on the movement path R1, the movable body 10 may interfere with the obstacle P. In the present embodiment, when there is a possibility that the movable body 10 may interfere with the obstacle P, an avoidance path R2 for avoiding the obstacle P is set, and switching to the avoidance path R2 is performed. This makes it possible to prevent interference with the obstacle P and appropriately avoid the obstacle P. The details of the avoidance path R2 will be described later. Note that the obstacle P is an object to be avoided by the movable body 10. In the present embodiment, the obstacle P may have a polygonal shape that does not include a curved line (curved surface) when viewed from the Z direction. Further, when viewed from the Z direction, the obstacle P has an angle formed by two sides connected via a vertex that is preferably 90 degrees or less, and more preferably the obstacle P has a rectangular shape, for example. In the following description, a case where the obstacle P has a rectangular shape when viewed from the Z direction will be described as an example. However, the obstacle P may have an arbitrary shape. For example, the obstacle P may have a shape including a curved line when viewed from the Z direction, and for example, may have a circular shape (cylindrical shape) when viewed from the Z direction. Furthermore, in the example of the present embodiment, the obstacle P is positioned at an angle with respect to the travel direction of the movement path R1, but the orientation of the obstacle P may be arbitrary.

Movable Body

Figure 2:
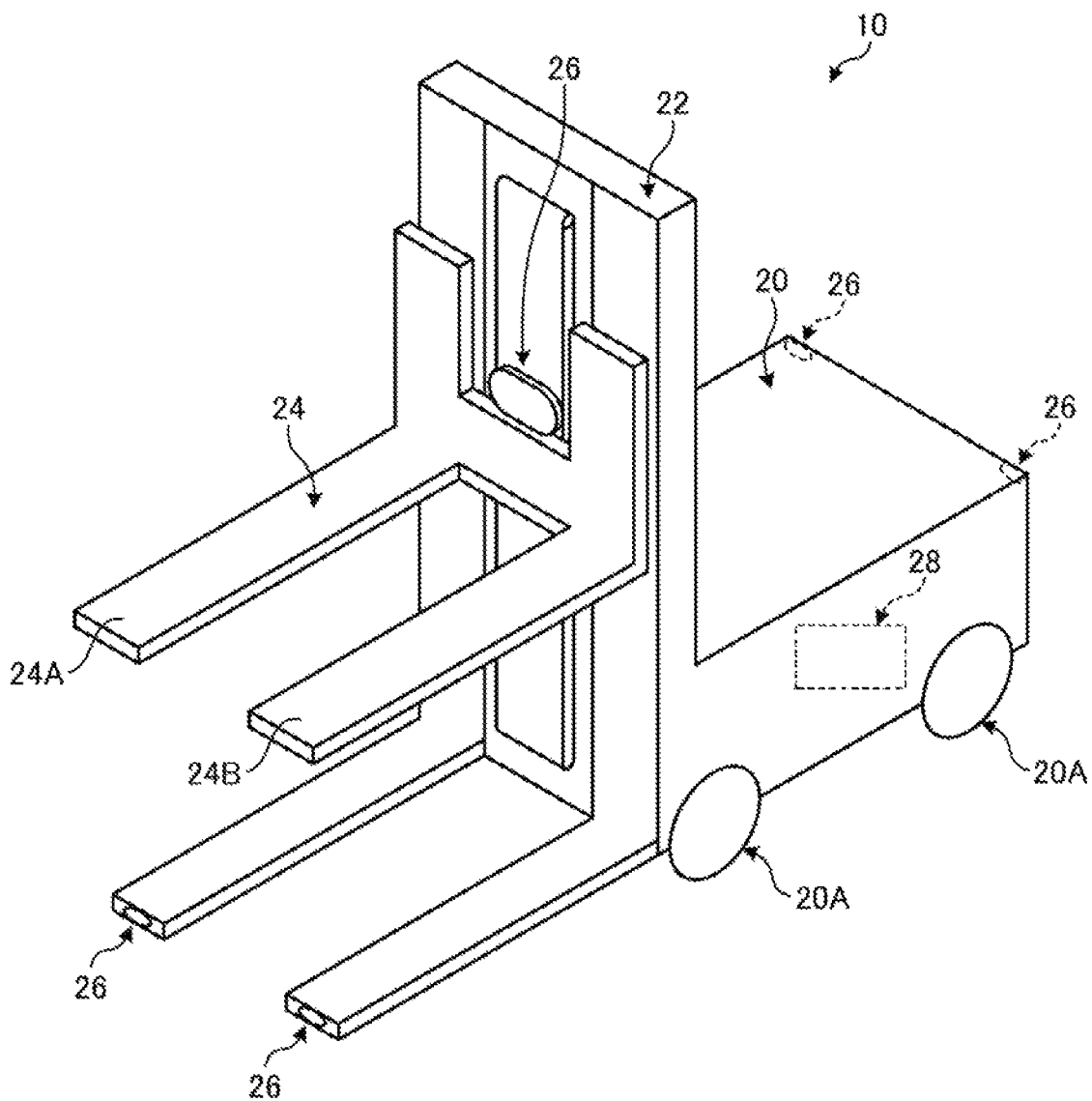
FIG. 2 is a schematic view of a configuration of a movable body.

FIG. 2 is a schematic view of a configuration of the movable body. The movable body 10 is a device capable of moving automatically. In the present embodiment, the movable body 10 is a forklift, and, in particular, a so-called automated guided forklift (AGF). As illustrated in FIG. 2, the movable body 10 includes a vehicle body 20, a mast 22, a fork 24, a sensor 26, and a control device 28. The vehicle body 20 has wheels 20A. The mast 22 is provided at one end of the vehicle body 20 in a front-back direction. The mast 22 extends along the vertical direction (here, the direction Z) orthogonal to the front-back direction. The fork 24 is attached to the mast 22 so as to be movable in the direction Z. The fork 24 may be movable in a lateral direction of the vehicle body 20 (a direction intersecting with the vertical direction and the front-back direction) with respect to the mast 22. The fork 24 has a pair of tines 24A and 24B. The tines 24A and 24B extend, from the mast 22, toward the front direction of the vehicle body 20. The tines 24A and 24B are arranged separated from each other in the lateral direction of the mast 22. In the front-back direction, a direction to a side of the movable body 10 where the fork 24 is provided and a direction to a side where the fork 24 is not provided are respectively referred to as a front direction and a back direction.

The sensors 26 detect at least one of the position and attitude of a target object in the periphery of the vehicle body 20. That is, it can be said that the sensor 26 detects a position of the target object relative to the movable body 10 and an attitude of the target object relative to the movable body 10. In the present embodiment, the sensors 26 are provided on the mast 22 and four corners of the vehicle body 20, that is, at left and right end portions on the front direction side and left and right end portions on the back direction side of the vehicle body 20. However, the positions where the sensors 26 are provided are not limited thereto, and the sensors 26 may be provided at any positions, and the number of the sensors 26 provided may be arbitrary. For example, a safety sensor provided on the movable body 10 may also be applied as the sensor 26. With the safety sensor thus applied also for such a purpose, no new sensor needs to be provided.

The sensors 26 detect (receives) reflected light from a peripheral target object to detect the position and attitude of the target object. Moreover, each of the sensors 26 is a sensor that emits light, and more specifically, emits a laser beam as light. The sensor 26 detects the reflected light of the emitted laser beam to detect the position and attitude of the target object. The sensor 26 emits the laser beam while performing scanning in one direction, and detects the position and attitude of the target object from the reflected light of the emitted laser beam. In other words, the sensor 26 is a so-called 2D-light detection and ranging (LiDAR) sensor. In the present embodiment, the sensor 26 scans the laser beam in a horizontal direction, that is, in the direction Z. Note that the sensor 26 is not limited to the one described above and may be a sensor that detects the target object using any method, such as so-called 3D-LiDAR in which scanning is performed in multiple directions, or may be a camera.

The control device 28 controls movement of the movable body 10. The control device 28 will be described later.

In the present embodiment, the movable body 10 is a forklift, but is not limited thereto, and may be any movable body. Further, the movable body 10 may be a non-holonomic system, that is, a system that cannot move in a lateral direction, and may be a system that has a restriction on a turning radius and a speed and is not able to move outside the range between the upper and lower limits. Furthermore, in the present embodiment, the movable body 10 moves within the facility W, but the place in which the movable body 10 moves is not limited to being within the facility W, and may be arbitrary.

Information Processing Device

Figure 3:
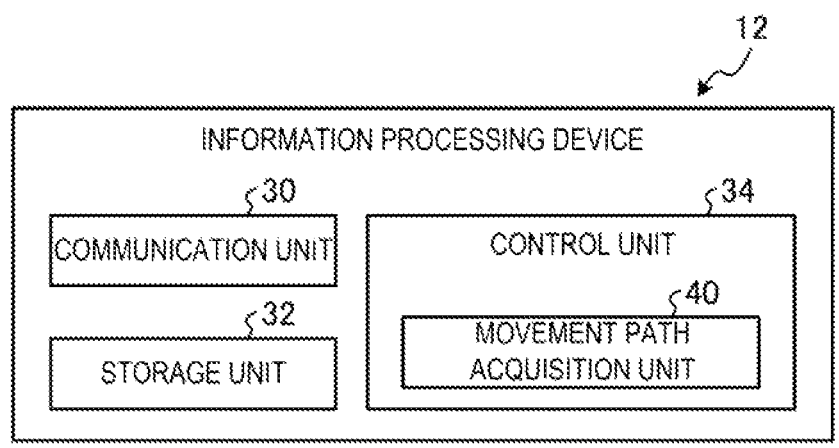
FIG. 3 is a schematic block diagram of an information processing device.

FIG. 3 is a schematic block diagram of the information processing device. The information processing device 12 is provided in the facility W, and is a device that transmits and receives at least the information about the movement of the movable body 10 or the like to and from the movable body 10, that is, a so-called ground system. The information processing device 12 is a computer, and as illustrated in FIG. 3, includes a communication unit 30, a storage unit 32, and a control unit 34. The communication unit 30 is a module used by the control unit 34 to communicate with an external device such as the movable body 10, and may include, for example, an antenna or the like. The communication method of the communication unit 30 is wireless communication in the present embodiment, but any communication method may be used. The storage unit 32 is a memory that stores various information such as computation contents of the control unit 34 and programs, and includes, for example, at least one of a primary storage device such as a random access memory (RAM) or a read only memory (ROM), and an external storage device such as a hard disk drive (HDD).

The control unit 34 is a computation device, that is, a central processing unit (CPU). The control unit 34 includes a movement path acquisition unit 40. The control unit 34 reads a program (software) from the storage unit 32 and executes it to implement the movement path acquisition unit 40 and perform its processing. Note that the control unit 44 may execute such processing with a single CPU, or may include a plurality of CPUs and execute the processing with the plurality of CPUs. Further, at least a part of the processing of the movement path acquisition unit 40 may be implemented by a hardware circuit. The program stored in the storage unit 32 for the control unit 34 may be stored in a recording medium that is readable by the information processing device 12.

The movement path acquisition unit 40 acquires the information about the movement path R1 of the movable body 10. The movement path acquisition unit 40 may set the movement path R1 based on, for example, the work content assigned to the movable body 10. The movement path acquisition unit 40 transmits the acquired information about the movement path R1 to the target movable body 10 via the communication unit 30. Note that, in the present embodiment, as illustrated in the example of FIG. 1, the movement path R1 is a path along the direction X, but the movement path R1 is not limited thereto, and may be arbitrary. In addition, the movement path R1 is not limited to being set by the information processing device 12, and may be set by the movable body 10, or may be set by a management system such as a warehouse management system (WMS) that manages the physical distribution in the facility W.

Control Device of Movable Body

Figure 4:
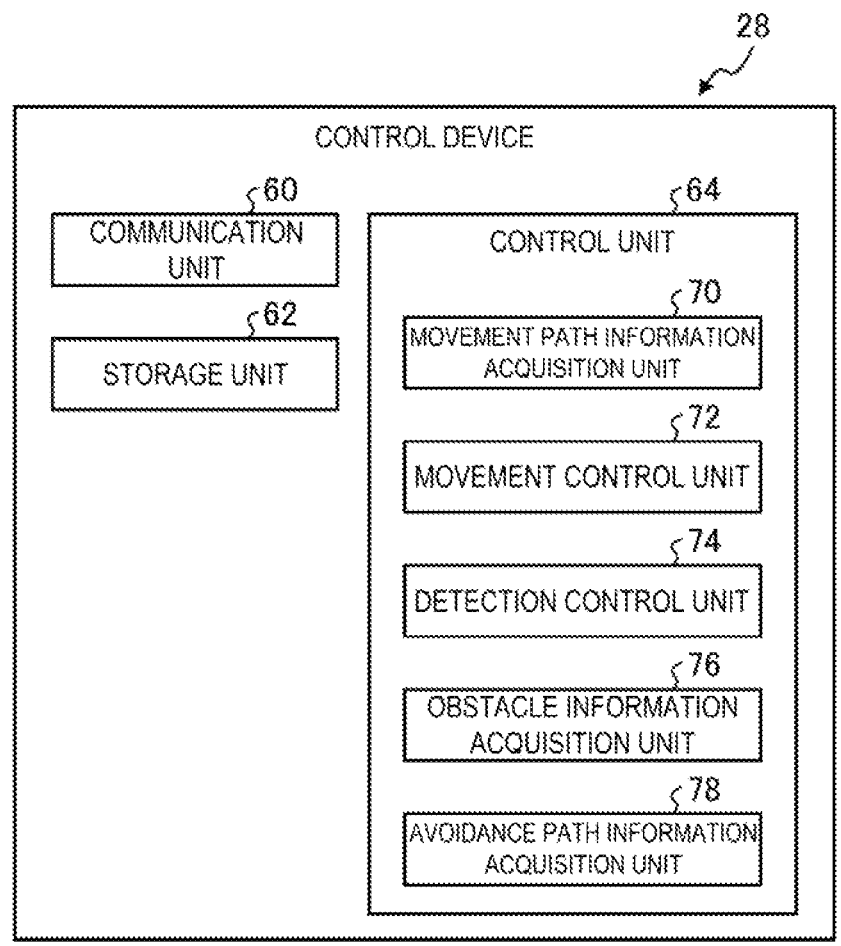
FIG. 4 is a schematic block diagram of a control device for the movable body.

Next, the control device 28 of the movable body 10 will be described. FIG. 4 is a schematic block diagram of the control device of the movable body. The control device 28 controls the movable body 10. The control device 28 sets the avoidance path R2 based on the detection result by the sensor 26 of the movable body 10, and causes the movable body 10 to move along the avoidance path R2. The control device 28 is a computer, and as illustrated in FIG. 4, includes a communication unit 60, a storage unit 62, and a control unit 64. The communication unit 60 is a module used by the control unit 64 to communicate with an external device such as the information processing device 12, and may include, for example, an antenna or the like. The communication method of the communication unit 60 is wireless communication in the present embodiment, but any communication method may be used. The storage unit 62 is a memory for storing various information such as computation content of the control unit 64 and programs, and includes, for example, at least one of a primary storage device such as a RAM or a ROM, and an external storage device such as an HDD.

The control unit 64 is a computation device, that is, a CPU. The control unit 64 includes a movement path information acquisition unit 70, a movement control unit 72, a detection control unit 74, an obstacle information acquisition unit 76, and an avoidance path information acquisition unit 78. The control unit 64 reads a program (software) from the storage unit 62 and executes it to implement the movement path information acquisition unit 70, the movement control unit 72, the detection control unit 74, the obstacle information acquisition unit 76, and the avoidance path information acquisition unit 78, and executes the processing of those units. Note that the control unit 64 may execute such processing with a single CPU, or may include a plurality of CPUs and execute the processing with the plurality of CPUs. At least a part of the movement path information acquisition unit 70, the movement control unit 72, the detection control unit 74, the obstacle information acquisition unit 76, and the avoidance path information acquisition unit 78 may be implemented by a hardware circuit. Furthermore, the program stored in the storage unit 62 for the control unit 64 may be stored in a recording medium that is readable by the control device 28.

Movement Path Information Acquisition Unit

The movement path information acquisition unit 70 acquires the information about the movement path R1. When the movable body 10 is selected as a work object, the movement path information acquisition unit 70 may acquire the information about the movement path R1 from the information processing device 12 or may read the information about the movement path R1 stored in advance in the storage unit 62.

Movement Control Unit

The movement control unit 72 controls a movement mechanism such as a drive unit or steering device of the movable body 10 to control the movement of the movable body 10. The movement control unit 72 causes the movable body 10 to move along the movement path R1 acquired by the movement path information acquisition unit 70, or along the avoidance path R2 acquired by the avoidance path information acquisition unit 78 to be described later. The movement control unit 72 causes the movable body 10 to move through the movement path R1 or the avoidance path R2 by successively grasping the position information of the movable body 10. The method of acquiring the position information of the movable body 10 is arbitrary. In the present embodiment, for example, a detection body (not illustrated) is provided in the facility W, and the movement control unit 72 acquires the information about the position and attitude of the movable body 10 based on the detection of the detection body. Specifically, the movable body 10 irradiates the detection body with a laser beam, receives light of the laser beam reflected from the detection body, and detects the position and attitude of the movable body 10 in the facility W. Here, the position of the movable body 10 refers to coordinates in the two-dimensional coordinate system CO in the direction X and the direction Y in the area AR of the facility W, and in the following description, unless otherwise described, a position refers to coordinates in the two-dimensional coordinate system CO. The attitude of the movable body 10 refers to the orientation (rotation angle) of the movable body 10 when viewed from the direction Z orthogonal to the direction X and the direction Y. The method of acquiring the information about the position and attitude of the movable body 10 is not limited to using a detection body, and a self-position estimation technology such as simultaneous localization and mapping (SLAM) may be used, for example.

Detection Control Unit

The detection control unit 74 causes the sensor 26 to detect the obstacle P a plurality of times. The specific processing content of the detection control unit 74 will be described later.

Obstacle Information Acquisition Unit

The obstacle information acquisition unit 76 acquires the determination result of the position and attitude of the front surface Pa of the obstacle P determined based on the detection result of the obstacle P by the sensor 26. Further, the obstacle information acquisition unit 76 acquires the determination result of the position and attitude of the side surface Pb of the obstacle P determined based on the detection result of the obstacle P by the sensor 26 obtained during movement along the avoidance path R2. The specific processing of the obstacle information acquisition unit 76 will be described later.

Avoidance Path Information Acquisition Unit

The avoidance path information acquisition unit 78 acquires the information about the avoidance path R2 generated based on the determination result of the position and attitude of the front surface Pa of the obstacle P. Further, the avoidance path information acquisition unit 78 acquires the information about the avoidance path R2 updated based on the determination result of the position and attitude of the side surface Pb of the obstacle P. The specific processing of the avoidance path information acquisition unit 78 will be described later.

Processing of Control Device

Next, processing of the control device 28 performed when the movable body 10 avoids the obstacle P will be described.

Movement along Movement Path

Figure 5:
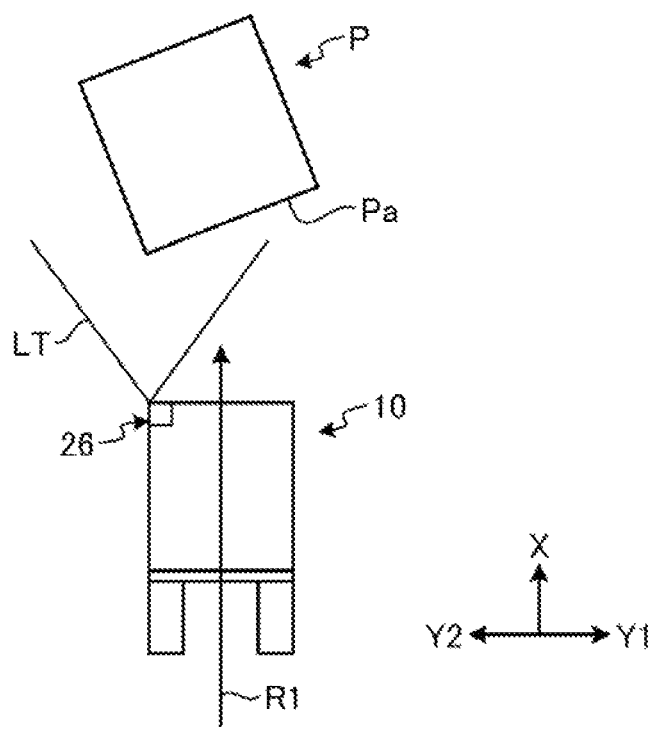
FIG. 5 is a schematic view for describing the detection of an obstacle.

FIG. 5 is a schematic view for describing the detection of an obstacle. The movement control unit 72 of the control device 28 causes the movable body 10 to move along the movement path R1 acquired by the movement path information acquisition unit 70. As illustrated in FIG. 5, the detection control unit 74 causes the sensor 26 to perform detection while the movable body 10 moves along the movement path R1. The detection control unit 74 causes the sensor 26 to perform detection on the travel direction side of the movement path R1 while the movable body 10 moves along the movement path R1. Based on the detection result by the sensor 26, the detection control unit 74 determines whether the obstacle P is present on the travel direction side of the movement path R1, in other words, whether the movable body 10 interferes with the obstacle P when it keeps moving along the movement path R1. The method of determining whether the obstacle P is present on the travel direction side may be arbitrary. For example, the detection control unit 74 may determine that the obstacle P is present on the travel direction side when the reflected light of the laser beam LT emitted toward the travel direction is received.

Determination of Position and Attitude of Front Surface of Obstacle

When it is determined that the obstacle P is present on the travel direction side, the control device 28 executes a process of determining the position and attitude of the front surface Pa of the obstacle P. The front surface Pa of the obstacle P refers to the surface of the obstacle P opposite to the travel direction of the movement path R 1 (the direction X in the example of the present embodiment), that is, the surface of the obstacle P on the opposite side of the travel direction of the movement path R1 (the opposite side of the direction X in the example of the present embodiment). In the following, the process of determining the position and attitude of the front surface Pa will be described.

Acquisition of Point Cloud

In executing the process of determining the position and attitude of the front surface Pa of the obstacle P, the movement control unit 72 decreases the movement speed of the movable body 10, and the detection control unit 74 keeps the sensor 26 performing detection on the travel direction side so as to cause the sensor 26 to detect a region including the front surface Pa of the obstacle P. Specifically, the detection control unit 74 causes the sensor 26 to emit a light beam LT toward the travel direction side of the movement path R1 while scanning the laser beam LT. The laser beam LT is reflected on the front surface Pa of the obstacle P, and the sensor 26 receives the reflected light from the front surface Pa of the obstacle P. The detection control unit 74 acquires a point cloud M0 which is a set of measuring points M, based on the detection result of the reflected light received by the sensor 26. The measuring point M refers to a point indicating a position (coordinates) at which the laser beam LT is reflected, and the point cloud M0 refers to a set of points each indicating a position at which the laser beam LT is reflected. In the present embodiment, based on the detection result of the reflected light and the position of the movable body 10, the detection control unit 74 calculates the position (coordinates) of the point at which the reflected light is reflected in the two-dimensional coordinate system CO in the direction X and the direction Y, as a measuring point M. However, the detection control unit 74 is not limited to setting a position in the two-dimensional coordinate system CO as a measuring point M, and may set a position in a coordinate system on the basis of the sensor 26 or the movable body 10 as a measuring point M. Further, in the present embodiment, the movement speed of the movable body 10 is decreased, but the process of decreasing the movement speed is not necessary.

Extraction of Point Cloud

Figure 6:
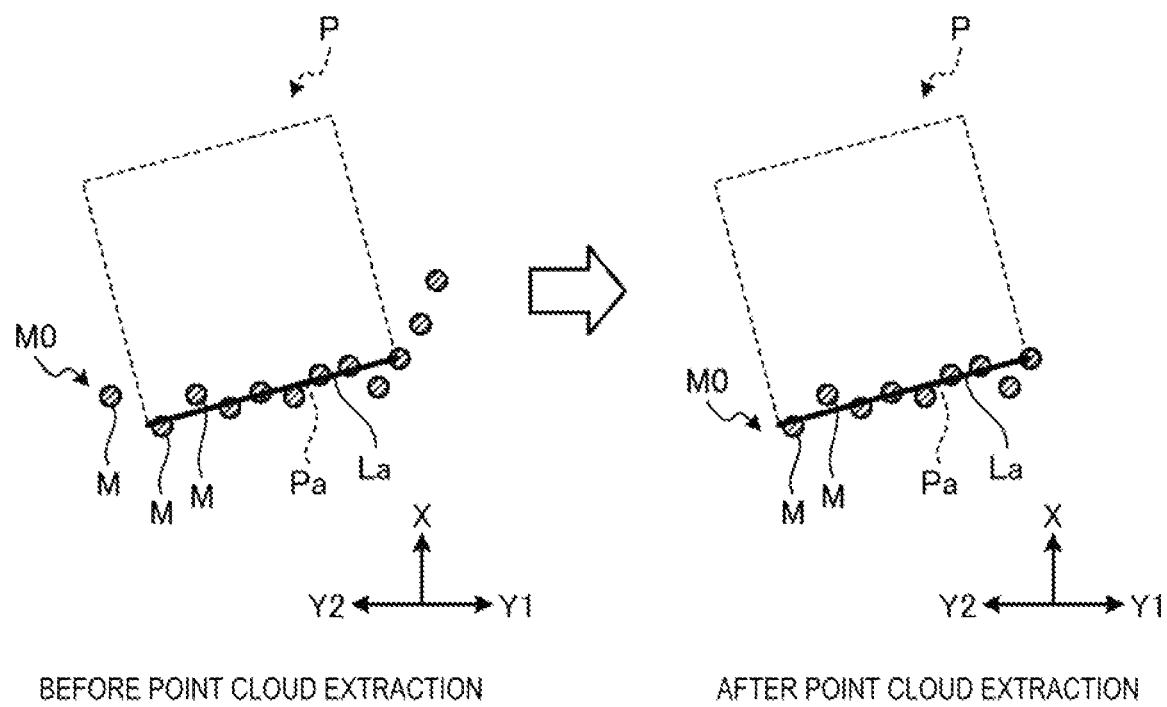
FIG. 6 is a schematic view for describing the extraction of a point cloud.

FIG. 6 is a schematic view for describing the extraction of a point cloud. The detection control unit 74 extracts the measuring points M to be superimposed by the obstacle information acquisition unit 76 to be described later, in other words, the measuring points M used to determine the position and attitude of the front surface Pa of the obstacle P, from among the measuring points M included in a point cloud M0 acquired by the single detection (the single scanning of laser beam LT) by the sensor 26. The detection control unit 74 extracts the measuring points M corresponding to the front surface Pa of the obstacle P from the measuring points M acquired by the single detection by the sensor 26 as the measuring points M to be superimposed by the obstacle information acquisition unit 76. The detection control unit 74 stores the information about the extracted measuring points M in a buffer included in the storage unit 62. In the present embodiment, the detection control unit 74 calculates a straight line La (the position and the attitude of the straight line La) corresponding to the front surface Pa of the obstacle P based on the measuring points M acquired by the single detection by the sensor 26, and selects the measuring points M to be extracted based on the positional relationship between the straight line La and the measuring points M. An example of the process of extracting measuring points M will be described in detail below.

Acquisition of Straight Line Candidates

Figure 7:
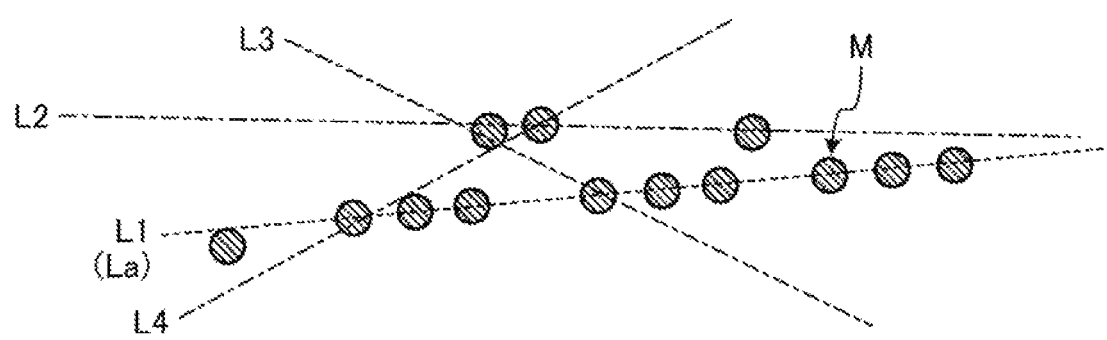
FIG. 7 is a schematic view illustrating a specific example of straight line candidates.

FIG. 7 is a schematic view illustrating a specific example of straight line candidates. As illustrated in FIG. 7, the detection control unit 74 acquires one or more straight line candidates in order to detect a straight line La corresponding to the front surface Pa of the obstacle p. In the present embodiment, the detection control unit 74 acquires, as a straight line candidate, a straight line connecting two measuring points M selected from the measuring points M included in the point cloud M0 acquired by the single detection by the sensor 26. More specifically, the detection control unit 74 may be configured to acquire, as a straight line candidate, a straight line connecting two measuring points M selected by the random sample consensus (RANSAC) algorithm from the measuring points M acquired by the single detection by the sensor 26. In that case, the detection control unit 74 may select two measuring points M from among all the measuring points M acquired by the single detection, or may set a detection target region, which is a so-called region of interest (ROI), and select two measuring points M from the measuring points M included in the detection target region. The detection target region in this case may be set in any manner. Note that RANSAC is a technique of randomly selecting two points to calculate an evaluation value. However, the method of acquiring straight line candidates according to the present disclosure is not limited to the technique using RANSAC, and other algorithms such as progressive sample consensus (PROSAC) may be used.

Detection of Straight Line La

The detection control unit 74 calculates an integrated score value for each of one or more straight line candidates, and detects a straight line La corresponding to the front surface Pa of the obstacle P based the integrated score value. In the following, as an example, the detection control unit 74 selects the straight line candidate L1 illustrated in FIG. 7 as a straight line La based on an integrated score value.

Here, an integrated score value will be described. For example, when a straight line candidate having a high integrated score value is preferentially selected as a straight line to be used for line segment detection, "a score with a low-priority constant" means a score having a value that decreases an integrated score value. On the other hand, for example, when a straight line candidate having a low integrated score value is preferentially selected, "a score with a low-priority constant" means a score having a value that increases an integrated score value.

In calculating an integrated score value, the detection control unit 74 uses a vertical distance between each measuring point M constituting a point cloud M0 and a straight line candidate. Specifically, the detection control unit 74 assigns a higher priority score to a measuring point M located at less than a specified distance from a straight line candidate than to a measuring point M located on the near side (the side closer to the position of the movable body 10 at the time of detection) at the specified distance or more from the straight line candidate, and the closer to the straight line candidate the measuring point M is, the higher the priority score that is assigned. For example, the detection control unit 74 assigns a score with a negative constant to a measuring point M located on the near side at the specified distance or more, while assigning a positive score to a measuring point M located at less than the specified distance. A positive score value is a variable that depends on the distance from a straight line candidate.

Figure 8:
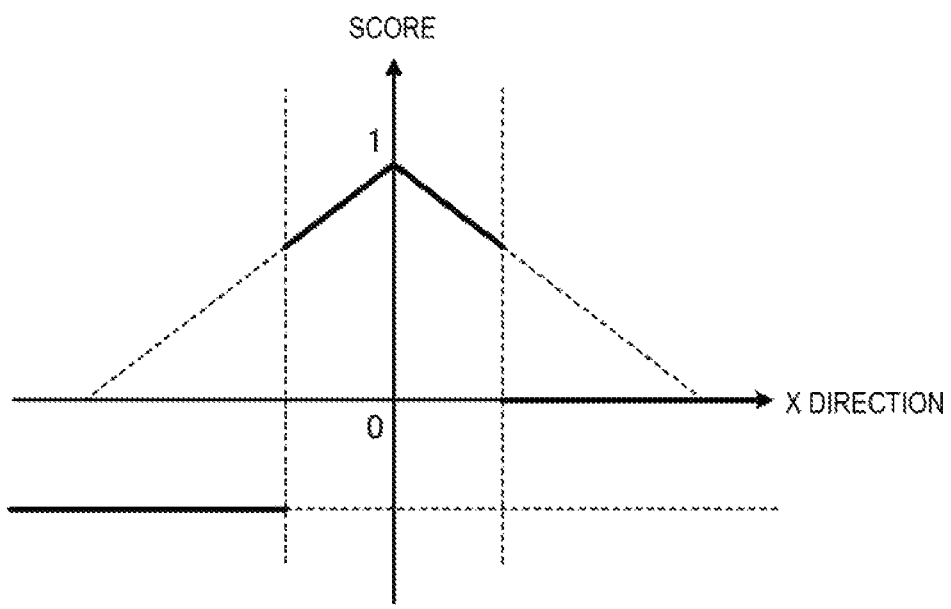
FIG. 8 is a graph showing an example of a score.

FIG. 8 is a graph showing an example of a score. The horizontal axis of the graph corresponds to the X direction (depth) and indicates the distance between a measuring point M and a straight line candidate, meaning more to the right side in the horizontal axis corresponds to being more to the far side (the side far from the movable body 10 at the time of detection). The position where the depth is zero is the position of the straight line candidate. The vertical axis indicates the value of a score to be assigned. In the example illustrated in FIG. 8, a score with a negative constant is assigned to a measuring point M located on the near side at the specified distance or more from the straight line candidate. In this manner, a certain penalty is imposed on a measuring point M located on the near side at the specified distance or more from the straight line candidate, regardless of the distance between the straight line candidate and the measuring point M. A positive score is assigned to a measuring point M located at less than the specified distance from the straight line candidate, the positive score being higher as the measuring point M gets closer to the straight line candidate.

In calculating an integrated score value, the detection control unit 74 excludes measuring points M located on the far side at the specified distance or more from the straight line candidate, from the integration target of the integrated score value. "Excluding measuring points M from the integration target of the integrated score value" means that the measuring points M are substantially excluded from the integration target of the integrated score value, and may mean that a score of zero is assigned to the measuring points M, or no score is assigned to the measuring points M. In the example illustrated in FIG. 8, a score of zero is assigned to a measuring point M located on the far side at the specified distance or more from the straight line candidate. In the example illustrated in FIG. 7, when the above-described method of calculating the integrated score value is used, the straight line candidate L1 is selected as the straight line La. Note that the detection control unit 74 may detect a plurality of straight lines with a high priority represented by the integrated score value.

The detection control unit 74 selects a straight line La from straight line candidates based on the integrated score value as described above. However, the detection control unit 74 may set a line segment obtained by dividing a straight line candidate selected based on the integrated score value by two points as a straight line La. In that case, the two points correspond to both ends of the obstacle P in the width direction. Then, the detection control unit 74 extracts one or more line segments from the selected straight line candidate, and searches for one line segment or a combination of two or more line segments having an end-to-end length corresponding to the length between the both ends of the obstacle P, from the extracted one or more line segments. "Corresponding length" means a length within the range of tolerance. For example, when the dimensions of the obstacle P are known, the length between the both ends of the obstacle P may be stored in advance in the storage unit 62 of the control device 28 as the design information of the obstacle P. The detection control unit 74 may combine the line segment or the combination of the two or more line segments found to obtain a straight line La.

Extraction of Point Cloud Based on Straight Line La

The detection control unit 74 extracts the measuring points M to be superimposed by the obstacle information acquisition unit 76 based on the positional relationship between the straight line La and the measuring points M detected as described above. For example, the detection control unit 74 may extract the measuring points M located within a predetermined range of distance from the straight line La as the measuring points M to be superimposed by the obstacle information acquisition unit 76. By extracting the measuring point M based on the positional relationship between the straight line La and the measuring points M in this manner, it is possible to exclude the measuring points M not corresponding to the front surface Pa of the obstacle P, appropriately extract the measuring points M corresponding to the front surface Pa of the obstacle P, and improve the accuracy of the detection of the position and attitude of the front surface Pa.

Note that, in the description above, the detection control unit 74 detects the straight line La using the point cloud M0 acquired by a single detection by the sensor 26, but is not limited thereto, and may detect a straight line La using a point cloud M0 acquired by a plurality of detections by the sensor 26. That is, the detection control unit 74 may detect a straight line La based on a point cloud M0 acquired by at least one detection. Further, the method of detecting a straight line La is not limited to the method described above, and any method may be used.

Furthermore, the method of extracting measuring points M is not limited to using a straight line La, and the detection control unit 74 may extract measuring points M in any method. Moreover, the process of extracting measuring points M itself is not necessary, and all of the measuring points M included in the point cloud M0 acquired by a single detection by the sensor 26 may be the measuring points M to be superimposed by the obstacle information acquisition unit 76.

A Plurality of Detections

The detection control unit 74 causes the sensor 26 to perform the detection of the front surface Pa of the obstacle P a plurality of times while the movable body 10 moves along the movement path R1. In other words, the detection control unit 74 causes the sensor 26 to scan the front surface Pa of the obstacle P with the laser beam LT a plurality of times while the movable body 10 moves along the movement path R1. The detection control unit 74 acquires a plurality of detection results by the sensor 26 as a point cloud M0. The detection control unit 74 executes the above-described process of calculating the measuring points M and extracting the measuring points M for each detection result by the sensor 26 (at each time the sensor 26 performs detection).

As described above, in the present embodiment, a plurality of detections is performed by the sensor 26 during the movement along the movement path R1. That is, because the detection control unit 74 causes the sensor 26 to perform detection at each position of the movable body 10 on the movement path R1, the positions of the movable body 10 at the times when respective detection results are acquired are different from each other. However, the timing of causing the sensor 26 to perform detection is not limited to during movement along the movement path R1. For example, the sensor 26 may perform detection in a state where the movable body 10 is stopped. Further, the detection control unit 74 is not limited to causing a single sensor 26 to perform detection a plurality of times, and may cause a plurality of sensors 26 to detect the same obstacle P and acquire a plurality of detection results by the sensors 26 as a point cloud M0.

Point Cloud Superimposition

Figure 9:
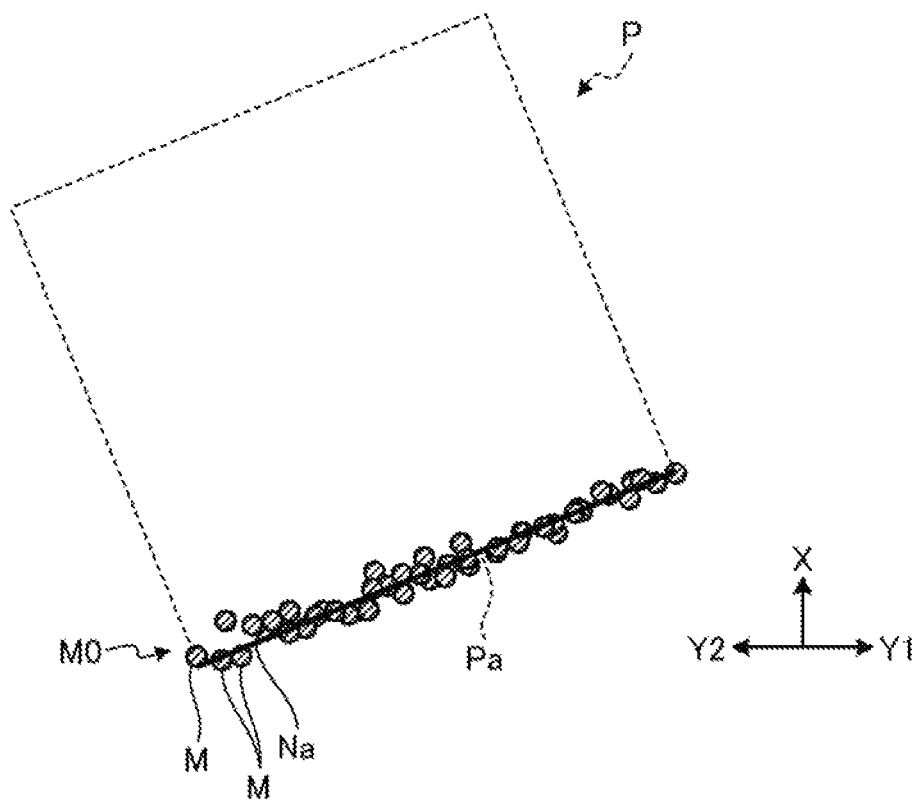
FIG. 9 is a schematic view for describing a specific example of point cloud superimposition.

FIG. 9 is a schematic view for describing a specific example of point cloud superimposition. As illustrated in FIG. 9, the obstacle information acquisition unit 76 superimposes the measuring points M (point cloud M0) extracted by the detection control unit 74 in the same coordinate system. In other words, the obstacle information acquisition unit 76 acquires the information about the position (coordinates) in the same coordinate system of the measuring points M extracted by the detection control unit 74 from among the measuring points M corresponding to a plurality of detection results by the sensor 26. In the present embodiment, the same coordinate system refers to the two-dimensional coordinate system CO in the direction X and the direction Y, and can also be said to be a coordinate system in the facility W. That is, the obstacle information acquisition unit 76 superimposes each of the measuring points M extracted by the detection control unit 74 in the two-dimensional coordinate system CO (plots them in the two-dimensional coordinate system CO). When the measuring points M are calculated as positions in the two-dimensional coordinate system CO, because the coordinate system for the measuring points M is common, the obstacle information acquisition unit 76 can acquire the information about the position of each of the measuring points M in the two-dimensional coordinate system CO without performing conversion processing of the coordinate system for each of the measuring points M. However, for example, when each of the measuring points M is calculated as a position, not in the same coordinate system, but in a coordinate system on the basis of the movable body 10 or the like, the obstacle information acquisition unit 76 performs the coordinate conversion for each of the measuring points M based on the position of the movable body 10 in the two-dimensional coordinate system CO at the time when each of the measuring points M is detected, and calculates the positions of the measuring points M in the two-dimensional coordinate system CO. Note that the coordinate system in which each of the measuring points M is superimposed is not limited to the two-dimensional coordinate system CO, and may be, for example, a three dimensional coordinate system.

Determination of Attitude of Front Surface of Obstacle

The obstacle information acquisition unit 76 determines the position and attitude of the front surface Pa of the obstacle P based on the position of each of the measuring points M (point cloud M0) superimposed in the two-dimensional coordinate system CO. In the present embodiment, the obstacle information acquisition unit 76 calculates an approximate line Na (the position and attitude of the approximate line Na in the two-dimensional coordinate system CO) of each of the superimposed measuring points M, and determines the attitude of the front surface Pa of the obstacle P based on the approximate line Na. For example, the obstacle information acquisition unit 76 sets the inclination of the approximate line Na in the two-dimensional coordinate system CO as the attitude of the obstacle P. As illustrated in FIG. 9, the approximate line Na is an approximate line of each of the superimposed measuring points M, and can be said to be the approximate line of each of the measuring points M corresponding to a plurality of detection results by the sensor 26. In the present embodiment, the obstacle information acquisition unit 76 calculates the approximate line Na by performing linear fitting on each of the superimposed measuring points M using the least square method. However, the method of calculating the approximate line Na is not limited to the least square method, and any method may be used. For example, the straight line La calculated based on the point cloud M0 acquired in the first detection by the sensor 26 may be used as the approximate line Na, or a plurality of straight lines may be generated using the superimposed measuring points M by RANSAC, and in view of the inclination distribution of each of the straight lines, a straight line close to the front surface Pa may be used as the approximate line Na. Note that the method of generating straight lines by RANSAC may be the same as the method of generating straight line candidates described above. Further, in the present embodiment, because the front surface Pa of the obstacle P is planar, the approximate line Na is calculated as a straight line, but the approximate line is not limited to being a straight line. For example, when the front surface Pa is known to be a curved surface, the approximate line Na may be calculated as a curved line.

Determination of Position of Front Surface of Obstacle

Figure 10:
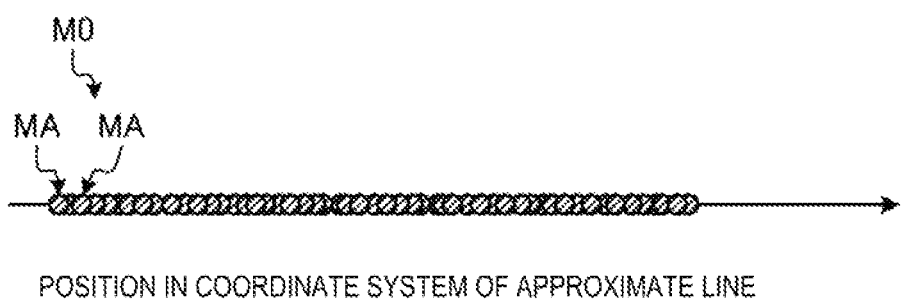
FIG. 10 is a schematic view illustrating an example of measuring points projected on an approximate line.

FIG. 10 is a schematic view illustrating an example of measuring points projected on an approximate line. The obstacle information acquisition unit 76 determines the position of the front surface Pa of the obstacle P based on the position of each of the superimposed measuring points M. More specifically, the obstacle information acquisition unit 76 determines the position of the front surface Pa of the obstacle P based on the position of each of the superimposed measuring points M in the coordinate system of the approximate line Na. In the present embodiment, as illustrated in FIG. 10, the obstacle information acquisition unit 76 converts the measuring points M in the two-dimensional coordinate system CO into measuring points MA in the coordinate system of the approximate line Na, by projecting the superimposed measuring points M (point cloud M0) onto the approximate line Na. In other words, it can be said that the measuring point MA is the measuring point M in the two-dimensional coordinate system CO that is converted by projection in the coordinate system of the approximate line Na. Note that the coordinate system of the approximate line Na is a one-dimensional coordinate, and the measuring point MA in the coordinate system of the approximate line Na refers to the position of the measuring point in the direction along the approximate line Na. For example, the obstacle information acquisition unit 76 may draw a perpendicular line from the measuring point M to the approximate line Na, and the intersection point between the perpendicular line and the approximate line Na may be taken as the measuring point MA.

Figure 11:
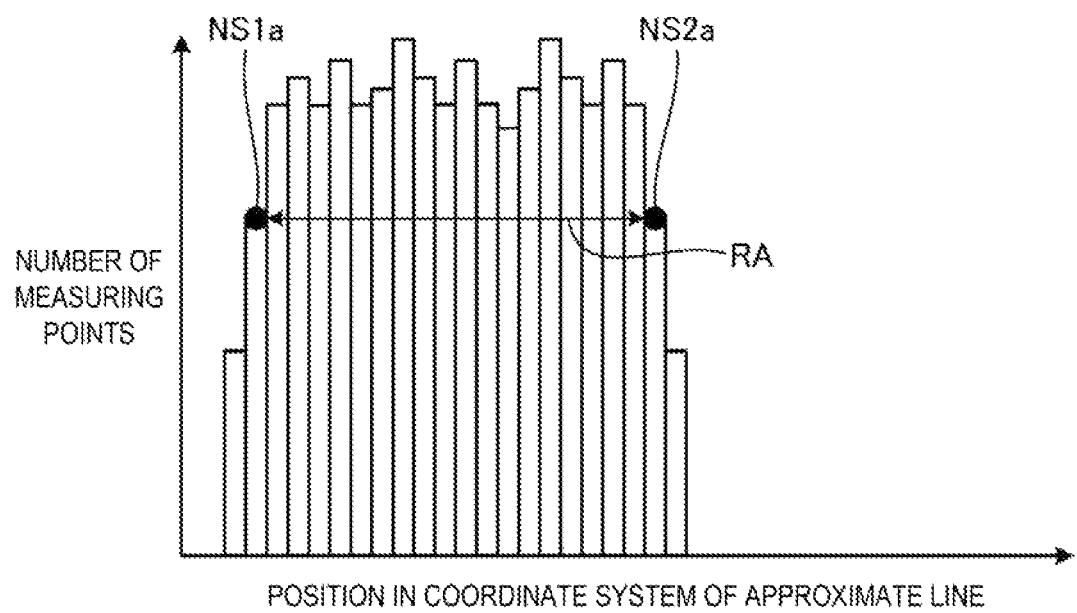
FIG. 11 is a schematic view illustrating an example of a histogram of measuring points.

FIG. 11 is a schematic view illustrating an example of a histogram of measuring points. The obstacle information acquisition unit 76 calculates the number of the measuring points MA at each position in the coordinate system of the approximate line N based on the measuring points MA in the coordinate system of the approximate line Na. For example, the obstacle information acquisition unit 76 divides the coordinate system of the approximate line Na into a plurality of unit ranges, and allocates each of the measuring points MA to any of the unit ranges. That is, the obstacle information acquisition unit 76 allocates the measuring point MA to a unit range that includes the position of the measuring point MA in the coordinate system of the approximate line Na. The obstacle information acquisition unit 76 performs the process of allocating the measuring points MA to the unit ranges for each of the measuring points MA and calculates the number of measuring points MA per unit range. FIG. 11 is a histogram illustrating an example of the number of measuring points MA per unit range. The obstacle information acquisition unit 76 may generate a histogram indicating the number of measuring points MA per unit range in the coordinate system of the approximate line Na, as illustrated in FIG. 11.

The obstacle information acquisition unit 76 determines the position of the obstacle P based on the number of measuring points MA (point cloud) in the coordinate system of the approximate line Na. For example, the obstacle information acquisition unit 76 extracts a range RA that includes a unit range in which the number of the measuring points MA is equal to or greater than a predetermined number, and determines both end points of the front surface Pa of the obstacle P in the width direction based on the position of the lower limit NS1a and the position of the upper limit NS2a of the range RA in the coordinate system of the approximate line Na. Here, the range RA preferably refers to a range (section) in the coordinate system of the approximate line N, in which the number of measuring points MA is equal to or greater than the predetermined number in all the unit ranges included in the range RA. Here, the predetermined number may be set arbitrarily, and for example, may be determined based on the maximum value or the average value of the number of measuring points MA per unit range, and for example, one half of the average value may be set as the predetermined number.

Figure 12:
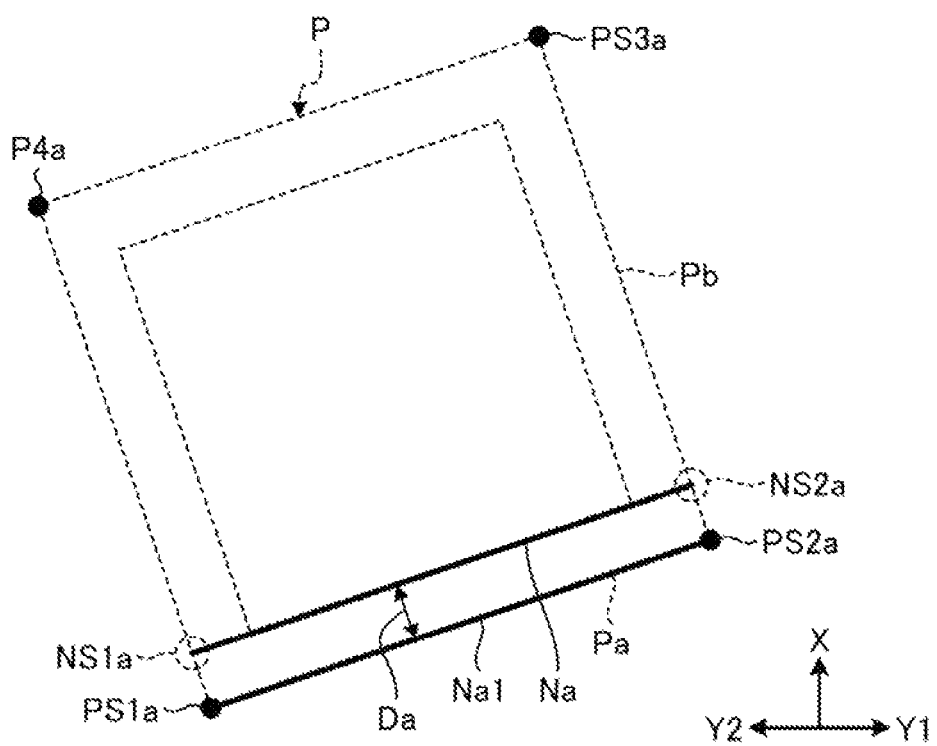
FIG. 12 is a schematic view for describing an example of a method of determining a position and an attitude of a front surface of an obstacle.

FIG. 12 is a schematic view for describing an example of a method of determining the position and attitude of the front surface of the obstacle. In the present embodiment, as illustrated in FIG. 12, the obstacle information acquisition unit 76 translates the approximate line Na in the two-dimensional coordinate system CO by a predetermined distance Da in a direction opposite to the travel direction of the movement path R1 without changing the attitude, and determines a line segment Na1 obtained by dividing the translated approximate line Na by an end point PS1a and an end point PS2a as the front surface Pa of the obstacle P. In other words, the obstacle information acquisition unit 76 determines the inclination of the line segment Na1 as the attitude of the front surface Pa, and determines the end point PS1a and the end point PS2a as the end point on one side and the end point on the other side of the front surface Pa in the width direction, respectively. Note that the predetermined distance Da is a distance that is set in view of a safety margin, and may be calculated in any manner. For example, the predetermined distance Da may be a value of a standard deviation of the distance between the measuring points M and the approximate line Na with respect to each of the superimposed measuring points M. The end points PS1a and PS2a are set based on the position of the lower limit NS1a and the position of the upper limit NS1b of the range RA. Specifically, in the two-dimensional coordinate system CO, the end points PS1a and PS2a are the positions obtained by moving the positions NS1a and NS2a on the approximate line Na toward a direction opposite to the travel direction of the movement path R1 by the predetermined distance Da.

The obstacle information acquisition unit 76 determines the position and attitude of the front surface Pa of the obstacle P as described above. However, the method of determining the position and attitude of the front surface Pa by the obstacle information acquisition unit 76 is not limited to the one described above. The obstacle information acquisition unit 76 may determine the position and attitude of the front surface Pa in any manner based on the positions of the measuring points M (point cloud M0). For example, in the present embodiment, the obstacle information acquisition unit 76 determines the position and attitude of the front surface Pa based on the superimposed measuring points M, but the process of superimposing the measuring points M is not necessary, and the position and attitude of the front surface Pa may be determined based on the measuring points M acquired by the single detection by the sensor 26.

Generation of Avoidance Path

Figure 13:
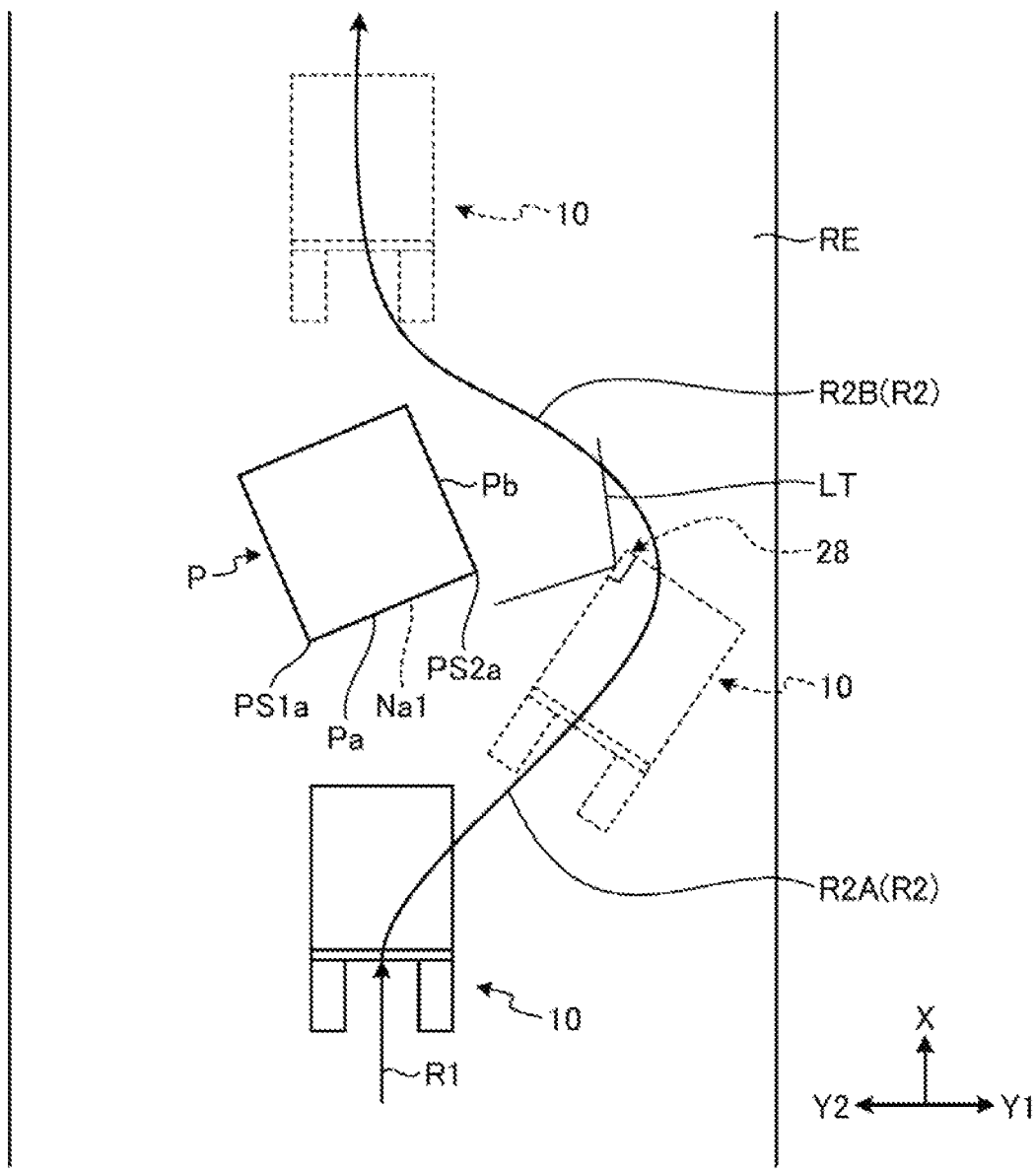
FIG. 13 is a schematic view illustrating an example of an avoidance path.

FIG. 13 is a schematic view illustrating an example of an avoidance path. The avoidance path information acquisition unit 78 sets an avoidance path R2 based on the position and attitude of the front surface Pa of the obstacle P determined by the obstacle information acquisition unit 76. The avoidance path R2 is a path that avoids the obstacle P (so as not to interfere with the obstacle P) while heading toward the first direction side intersecting the travel direction (the X direction in the present example) of the movement path R1. In the present embodiment, the first direction is a direction orthogonal to the travel direction of the movement path R1. The avoidance path R2 will be described in more detail below.

The avoidance path information acquisition unit 78 sets the avoidance path R2 so as to include a track R2A along which the movable body 10 moves toward the first direction side without interfering with the obstacle P. The avoidance path information acquisition unit 78 preferably sets the track R2A such that the movable body 10 moves toward the first direction side without interfering with the obstacle P and the amount of movement toward the first direction side is minimized. In the following, the case where the direction Y1 is the first direction, and the end point PS1a is the end point on the direction Y2 side and PS2a is the end point on the direction Y1 side of the front surface Pa, will be described as an example. In this case, for example, the avoidance path information acquisition unit 78 sets a track that runs toward the X direction side (the travel direction of the movement path R1) while heading toward the direction Y1 side and reaches a position on the direction Y1 side of the obstacle P, as the track R2A.

Further, the avoidance path information acquisition unit 78 estimates the position and attitude of the side surface Pb of the obstacle P based on the determined position and attitude of the front surface Pa (the line segment Na1). Then, the avoidance path information acquisition unit 78 sets a track along which the movable body 10 moves toward the first direction side without interfering with the determined position of the front surface Pa (the line segment Na1) and the estimated position of the side surface Pb, as the track R2A. The side surface Pb is a surface on the first direction (the direction Y1) side of the obstacle P, that is, a surface opposite in the second direction (the direction Y2) to the movable body 10 that has moved to the first direction side of the obstacle P. For example, as illustrated in FIG. 12, the avoidance path information acquisition unit 78 estimates the position of a rear end point PS3a of the obstacle P on the direction Y 1 side on the rear side (the travel direction side of the movement path R1), based on the position and attitude of the front surface Pa of the obstacle P determined by the obstacle information acquisition unit 76. For example, the avoidance path information acquisition unit 78 sets a position separated from the end point PS2a in a direction orthogonal to the front surface Pa (the line segment Na1) and heading toward the rear side by the length of the front surface Pa, as the estimated position of the rear end point PS3a. The avoidance path information acquisition unit 78 considers the line segment connecting the rear end point PS3a and the end point PS2a as the estimated position of the side surface Pb of the obstacle P. Then, the avoidance path information acquisition unit 78 sets a track that runs toward the X direction side while heading toward the direction Y1 side and reaches a position on the direction Y1 side of the front surface Pa (the line segment Na1) and the estimated position of the side surface Pb, as the track R2A.

Further, the avoidance path information acquisition unit 78 sets the avoidance path R2 so as to include a track R2B that is connected to the track R2A and returns to the second direction (the direction Y2) side opposite to the first direction while avoiding the obstacle P. In this case, the avoidance path information acquisition unit 78 set a track along which the movable body 10 returns to the second direction (the direction Y2 in the present example) side opposite to the first direction while avoiding the estimated position of the side surface Pb, as the track R2B. Specifically, the avoidance path information acquisition unit 78 set the track R2B such that the movable body 10 moves toward the direction X while heading toward the direction Y2 and reaches the direction X side of the obstacle P without interfering with the estimated position of the side surface Pb (that is, by passing through the direction Y1 side of the estimated position of the side surface Pb). The position in the Y direction of the end point of the avoidance path R2 (the track R2B) having reached the direction X side of the obstacle P preferably overlaps with the position in the Y direction of a point in the movement path R1 that is identical in the direction X to the end point of the avoidance path R2. This makes it possible to appropriately switch from the avoidance path R2 back to the movement path R1 when the movable body 10 reaches the end point of the avoidance path R2.

Accordingly, it can be said that the avoidance path information acquisition unit 78 sets, as the avoidance path R2, a track including the track R2A that heads toward the first direction and reaches the first direction side of the obstacle P while avoiding the interference with the front surface Pa, and the track R2B that is connected to the track R2A, heads toward the second direction and reaches the travel direction side of the obstacle P of the movement path R1 while avoiding the interference with the side surface Pb. However, the avoidance path information acquisition unit 78 is not limited to including the track R2A and the track R2B in the avoidance path R2, and may set the avoidance path R2 so as to include at least the track R2A.

The avoidance path information acquisition unit 78 may set the avoidance path R2 based on a surface other than the front surface Pa and the side surface Pb of the obstacle P (for example, the rear surface opposite to the front surface Pa). In that case, for example, similarly to the rear end point PS3a, the position of the rear end point PS4a on the second direction (the direction Y2) side on the rear side is determined and the straight line connecting the rear end point PS3a and the rear end point PS4a is considered as the estimated position of the rear surface. Then, the avoidance path information acquisition unit 78 may set a second track along which the movable body 10 moves toward the direction Y2 (the second direction) without interfering with the estimated position of the rear surface.

In the present embodiment, a travelable region RE that is a region in which the movable body 10 can move is set in advance, and the movement path R1 is set such that the movable body 10 moving along the movement path R1 is located within the range of the travelable region RE. When the travelable region RE is set in this manner, the avoidance path information acquisition unit 78 sets the avoidance path R2 such that the movable body 10 moves within the range of the travelable region RE, that is, the movable body 10 does not go out of the range of the travelable region RE. The travelable region RE may be set arbitrarily. A region sandwiched between walls on both sides with respect to the travel direction of the movement path R1 may be set as the travelable region RE, or a region (a lane) in which movement along the travel direction of the movement path R1 is permitted may be set as the travelable region RE. Further, when a region (an opposite lane) in which movement along a direction opposite to the movement direction of the movement path R1 is permitted is present adjacent to the region (the lane) in which movement along the travel direction is permitted, a region including the lane and the opposite lane may be set as the travelable region RE.

Movement Along Avoidance Path

When the avoidance path R2 is generated by the avoidance path information acquisition unit 78, the movement control unit 72 switches from the movement path R1 to the avoidance path R2 and causes the movable body 10 to move along the avoidance path R2.

The movable body 10 moves along the avoidance path R2 and thereby is prevented from interfering with the obstacle P. However, the avoidance path R2 is generated so as to avoid the estimated position of the side surface Pb estimated based on the determination result of the front surface Pa of the obstacle P, and is not based on the result of actual detection of the side surface Pb. Therefore, for example, when the actual position of the side surface Pb protrudes to the direction Y1 side of the estimated position of the side surface Pb, there is a concern that the movable body 10 may interfere with the side surface Pb even though it moves along the avoidance path R2. On the other hand, when the actual position of the side surface Pb is recessed to the direction Y2 side of the estimated position of the side surface Pb, interference with the side surface Pb can be avoided, but the movable body 10 moving along the avoidance path R2 protrudes to the direction Y1 (the first direction) more than necessary. However, for example, when the travelable region RE is narrow or when the opposite lane is included in the travelable region RE, the movable body is required to not protrude too much to the direction Y1 as much as possible. In contrast, in the present embodiment, the position of the side surface Pb is detected by causing the sensor 26 to keep performing detection during movement along the avoidance path R2, and the avoidance path R2 is updated based on the detection result. This allows the movable body 10 to avoid interfere with the side surface Pb and to not protrude to the direction Y1 as much as possible. The specific description will be given below.

Process of Determining Position and Attitude of Side Surface of Obstacle

The control device 28 executes a process of determining the position and attitude of the side surface Pb of the obstacle P while the movable body 10 moves along the avoidance path R2. In this case, the detection control unit 74 causes the sensor 26 to detect a region including the side surface Pb of the obstacle P while the movable body 10 moves along the avoidance path R2. Specifically, the detection control unit 74 causes the sensor 26 to emit a light beam LT toward the obstacle P while scanning the laser beam LT. The detection control unit 74 acquires a point cloud Ma based on the detection result of the reflected light received by the sensor 26. That is, the point cloud M0a can be said to be a point cloud that is acquired based on the detection result by the sensor 26 while the movable body 10 moves along the avoidance path R2. Note that the direction of emitting the laser beam LT for detecting the side surface Pb of the obstacle P may be arbitrary. For example, the laser beam LT may be emitted to the second direction (the direction Y2) side.

Extraction of Point Cloud

Figure 14:
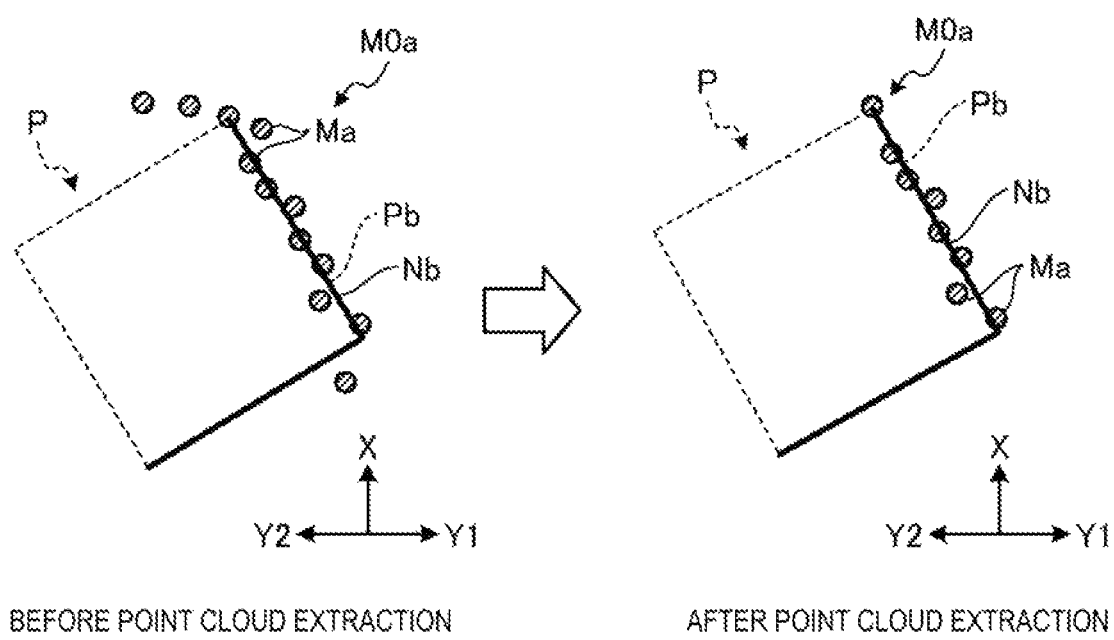
FIG. 14 is a schematic view for describing the extraction of a point cloud.

FIG. 14 is a schematic view for describing the extraction of a point cloud. As illustrated in FIG. 14, the detection control unit 74 extracts measuring points Ma to be superimposed by the obstacle information acquisition unit 76, in other words, the measuring points Ma used to determine the position and attitude of the side surface Pb, from among the measuring points Ma included in the point cloud M0a acquired by the single detection by the sensor 26. The detection control unit 74 extracts the measuring points Ma corresponding to the side surface Pb from the measuring points Ma acquired by the single detection by the sensor 26 as the measuring points Ma to be superimposed by the obstacle information acquisition unit 76. Here, the method of extracting the measuring points Ma is the same as the method of extracting the measuring points M corresponding to the front surface Pa from among the measuring points M acquired by the detection during movement along the movement path R1, and thus description thereof will be omitted. That is, as an example, the detection control unit 74 calculates a straight line Lb corresponding to the side surface Pb of the obstacle P based on the measuring points Ma, and selects the measuring points Ma to be extracted based on the positional relationship between the straight line Lb and the measuring points Ma. The method of calculating the straight line Lb is the same as the method of calculating the straight line La in extracting the measuring points M corresponding to the front surface Pa.

A Plurality of Detections

The detection control unit 74 causes the sensor 26 to perform the detection of the side surface Pb of the obstacle P a plurality of times while the movable body 10 moves along the avoidance path R2. In other words, the detection control unit 74 causes the sensor 26 to scan the obstacle P with the laser beam LT a plurality of times while the movable body 10 moves along the avoidance path R2. The detection control unit 74 acquires a plurality of detection results by the sensor 26 as the point cloud M0a. The detection control unit 74 executes the above-described process of calculating the measuring points Ma and extracting the measuring points Ma for each detection result by the sensor 26 (at each time the sensor 26 performs detection).

As described above, in the present embodiment, a plurality of detections is performed by the sensor 26 during the movement along the avoidance path R2. That is, because the detection control unit 74 causes the sensor 26 to perform detection at each position of the movable body 10 on the avoidance path R2, the positions of the movable body 10 at the times when respective detection results are acquired are different from each other. However, the timing of causing the sensor 26 to perform detection is not limited to during movement along the avoidance path R2. For example, the sensor 26 may perform detection in a state where the movable body 10 is stopped on the avoidance path R2. Further, the detection control unit 74 is not limited to causing a single sensor 26 to perform detection a plurality of times, and may cause a plurality of sensors 26 to detect the same obstacle P and acquire a plurality of detection results by the sensors 26 as the point cloud M0a.

Point Cloud Superimposition

Figure 15:
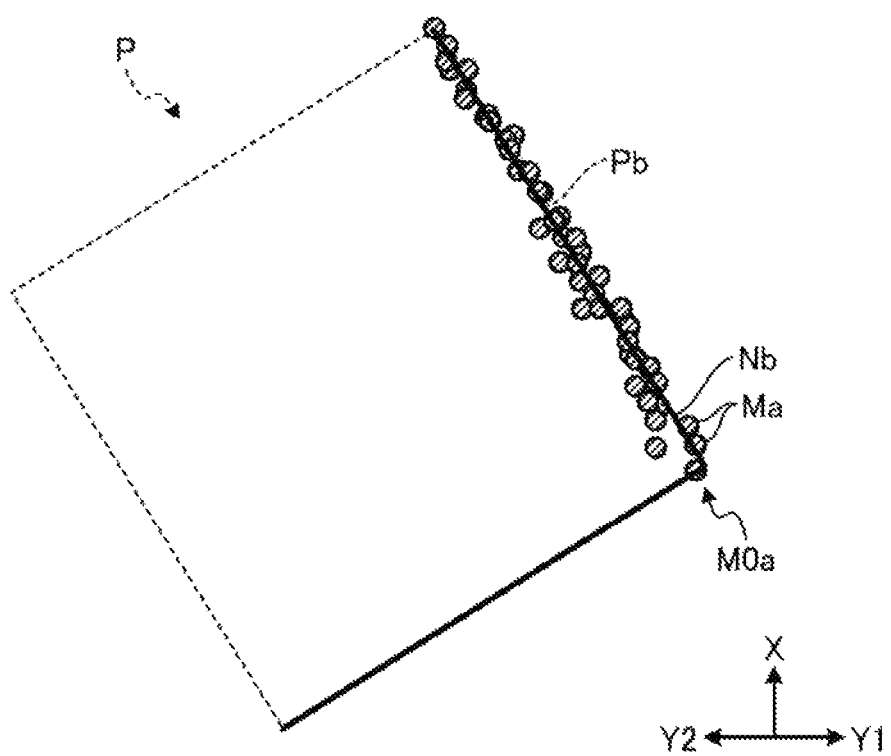
FIG. 15 is a schematic view for describing a specific example of point cloud superimposition.

FIG. 15 is a schematic view for describing a specific example of point cloud superimposition. As illustrated in FIG. 15, the obstacle information acquisition unit 76 superimposes the measuring points Ma (point cloud M0a) extracted by the detection control unit 74 in the same coordinate system, that is, in the two-dimensional coordinate system CO in this example.

Determination of Position and Attitude of Side Surface of Obstacle

Figure 16:
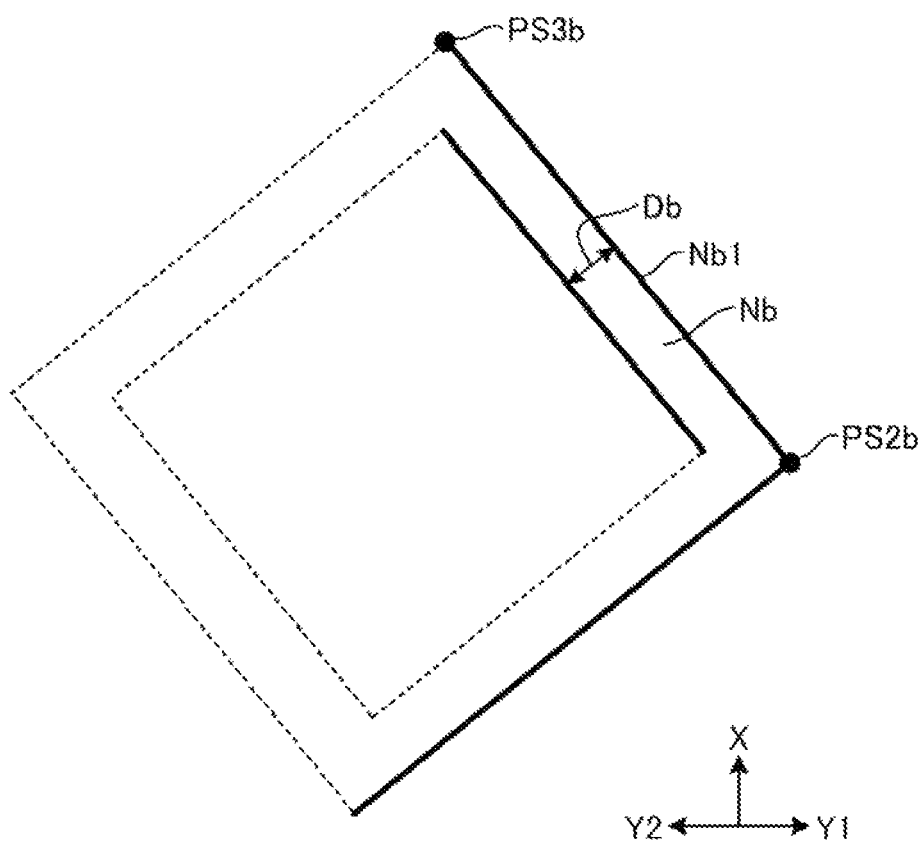
FIG. 16 is a schematic view for describing an example of a method of determining a position and an attitude of a side surface of an obstacle.

FIG. 16 is a schematic view for describing an example of a method of determining the position and attitude of the side surface of the obstacle. The obstacle information acquisition unit 76 determines the position and attitude of the side surface Pb of the obstacle P in the same manner as that for determining the position and attitude of the front surface Pa except that the measuring points Ma are used instead of the measuring points M. That is, as an example, the obstacle information acquisition unit 76 calculates an approximate line Nb of the superimposed measuring points Ma, and determines the inclination of the approximate line Nb as the attitude of the side surface Pb. Further, as illustrated in FIG. 16, the obstacle information acquisition unit 76 translates the approximate line Nb by a predetermined distance db in the first direction without changing the attitude, and determines a line segment Nb1 obtained by dividing the translated approximate line Nb by an end point PS2b and an end point PS3b as the side surface Pb of the obstacle P. Note that the predetermined distance db is calculated in the same manner as that for calculating the predetermined distance Da in determining the front surface Pa, and the positions of the end points PS2b and PS3b are calculated in the same manner as that for calculating the end points PS1a and PS2a in determining the front surface Pa.

The obstacle information acquisition unit 76 determines the position and attitude of the side surface Pb of the obstacle P as described above. However, the method of determining the position and attitude of the side surface Pb by the obstacle information acquisition unit 76 is not limited to the one described above. The obstacle information acquisition unit 76 may determine the position and attitude of the side surface Pb in any manner based on the positions of the measuring points Ma (the point cloud M0a). For example, in the present embodiment, the obstacle information acquisition unit 76 determines the position and attitude of the side surface Pb based on the superimposed measuring points Ma, but the process of superimposing the measuring points Ma is not necessary, and the position and attitude of the side surface Pb may be determined based on the measuring points Ma acquired by the single detection by the sensor 26.

Update of Avoidance Path

The avoidance path information acquisition unit 78 updates the avoidance path R2 based on the position and attitude of the side surface Pb of the obstacle P determined by the obstacle information acquisition unit 76. Here, the initially-generated avoidance path R2 has been set based on the estimated position of the side surface Pb estimated based on the determination result of the position and attitude of the front surface Pa. Then, the avoidance path information acquisition unit 78 sets the avoidance path R2 to be updated based on the position and attitude (the line segment Nb1) of the side surface Pb of the obstacle P determined by detection during movement along of the avoidance path R2. That is, the avoidance path information acquisition unit 78 sets the avoidance path R2 to be updated in the same manner as that for setting the initially-generated avoidance path R2, except that the position and attitude of the side surface Pb determined by detection during movement along the avoidance path R2 are used instead of those estimated based on the position and attitude of the front surface Pa.

However, while the initially-generated avoidance path R2 is a track starting from a position on the near side of the obstacle P on the movement path R1, the avoidance path R2 to be updated may be set as a track starting from the position of the movable body 10 on the avoidance path R2 at the time of updating the avoidance path R2. That is, for example, when the movable body 10 has reached the first direction side of the obstacle P before the time of updating the avoidance path R2, the track R2B that heads toward the second direction side and reaches the travel direction side (the X direction side) of the obstacle P of the movement path R1 while avoiding the interference with the side surface Pb may be set as the avoidance path R2 to be updated, without resetting the track R2A heading toward the first direction.

Movement Along Avoidance Path

Figure 17:
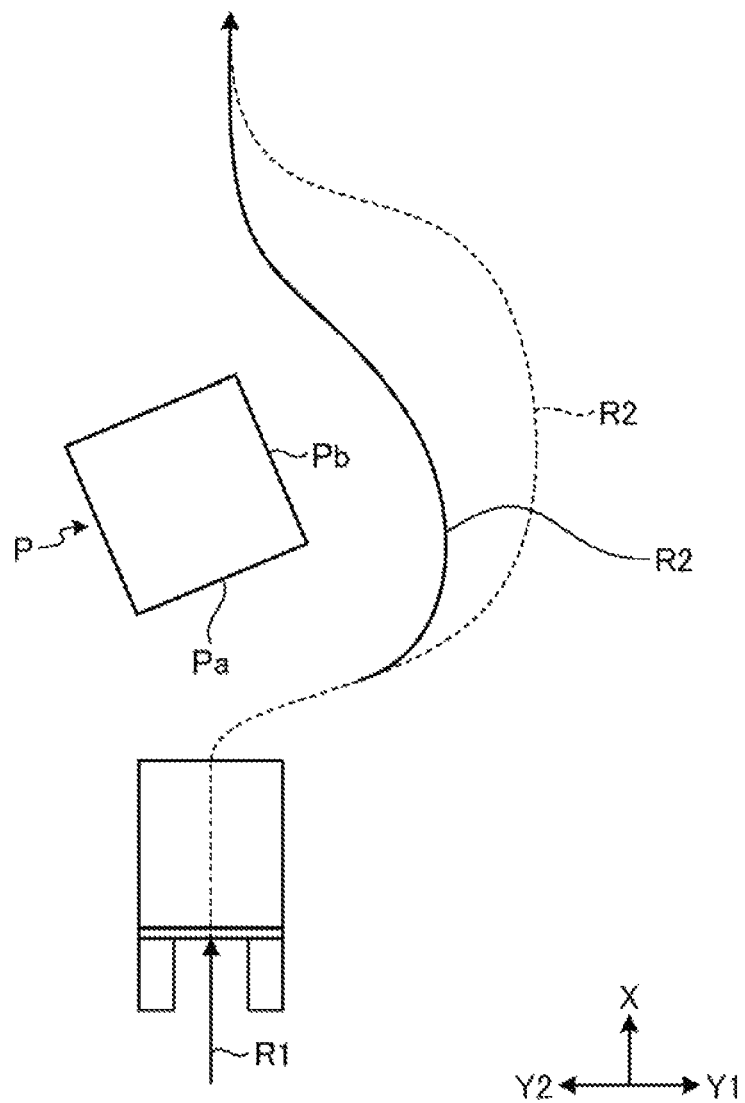
FIG. 17 is a schematic view for describing an example of the update of an avoidance path.

FIG. 17 is a schematic view for describing an example of the update of an avoidance path. When the avoidance path R2 is updated by the avoidance path information acquisition unit 78, the movement control unit 72 updates the avoidance path R2 and causes the movable body 10 to move along the updated avoidance path R2. Because the updated avoidance path R2 is set based on the side surface Pb determined from the detection result by the sensor 26, it is possible to appropriately prevent the interference between the movable body 10 and the side surface Pb by using the updated avoidance path R2. Further, as illustrated in FIG. 17, the avoidance path R2 before update (the dashed line in FIG. 17) may protrude too much to the direction Y1 side. On the other hand, because the updated avoidance path R2 (the solid line in FIG. 17) is generated so as not to protrude toward the direction Y1 as much as possible while avoiding the side surface Pb determined from the detection result by the sensor 26, it is possible to appropriately prevent protrusion to the direction Y1 side.

Processing Flow

Figure 18:
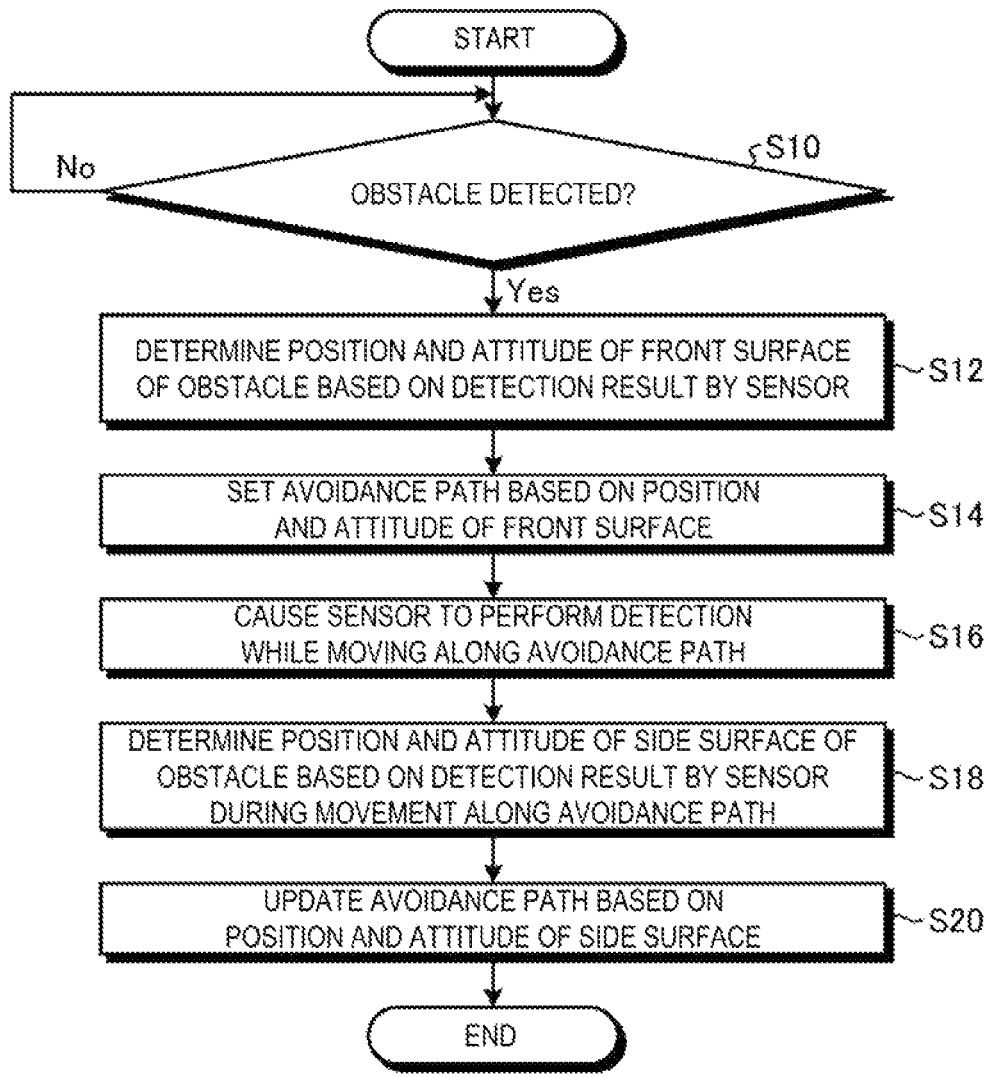
FIG. 18 is a flowchart for describing an update flow of an avoidance path according to a present embodiment.

Next, a flow of the process of updating the avoidance path R2 by the control device 28 will be described. FIG. 18 is a flowchart for describing an update flow of an avoidance path according to a present embodiment. As illustrated in FIG. 18, the detection control unit 74 of the control device 28 causes the sensor 26 to detect whether or not the obstacle P is present on the travel direction side of the movement path R1 while the movable body 10 moves along the movement path R1 (step S10). When the obstacle P is not detected (step S10; No), the process returns to step S10 to continue the movement along the movement path R1 and the detection of the obstacle P. When the obstacle P is detected (step S10; Yes), the obstacle information acquisition unit 76 of the control device 28 determines the position and attitude of the front surface Pa of the obstacle P based on the detection result by the sensor 26 (step S12). In the example of the present embodiment, the sensor 26 is caused to detect the obstacle P a plurality of times while the movement speed of the movable body 10 is decreased, and the obstacle information acquisition unit 76 superimposes the point cloud M0 acquired by the plurality of detections, and determines the position and attitude of the front surface Pa of the obstacle P based on the superimposed point cloud M0. The avoidance path information acquisition unit 78 of the control device 28 sets the avoidance path R2 based on the determination result of the position and attitude of the front surface Pa of the obstacle P (step S14), and the control device 28 causes the sensor 26 to perform detection while causing the movable body 10 to move along the avoidance path R2 (step S16). The obstacle information acquisition unit 76 of the control device 28 determines the position and attitude of the side surface Pb of the obstacle P based on the detection result by the sensor 26 during movement along the avoidance path R2 (step S18). In the example of the present embodiment, the sensor 26 is caused to detect the obstacle P a plurality of times during movement along the avoidance path R2, and the obstacle information acquisition unit 76 superimposes the point cloud M0a acquired by the plurality of detections, and determines the position and attitude of the side surface Pb of the obstacle P based on the superimposed point cloud M0a. The avoidance path information acquisition unit 78 updates the avoidance path R2 based on the determination result of the position and attitude of the side surface Pb of the obstacle P (step S20). The control device 28 switches to the updated avoidance path R2 and causes the movable body 10 to move along the updated avoidance path R2.

The number of times that the avoidance path R2 is updated may be arbitrary, and may be only once or may be a plurality of times. Further, for example, when the obstacle P has a polygonal shape and thus has a plurality of front surfaces Pa and a plurality of side surfaces Pb, the control device 28 may determine each of the front surfaces Pa and each of the side surfaces Pb in the same manner as described above, and set and update the avoidance path R2 so as to avoid them.

Effect

As described above, the movable body 10 according to the present embodiment generates the avoidance path R2 by determining the front surface Pa of the obstacle P based on the detection by the sensor 26, and updates the avoidance path R2 by determining the side surface Pb of the obstacle P based on the detection by the sensor 26 during movement along the avoidance path R2. According to the present embodiment, the avoidance path R2 is updated by determining the side surface Pb and thus can be an appropriate path that avoids collision with the side surface Pb. Further, in the present embodiment, the position and attitude of the obstacle P are determined by extracting the point clouds M0 and M0a suitable for determining the position and attitude of the obstacle P from the point clouds M0 and M0a obtained by the single detection by the sensor 26, and superimposing the extracted point clouds M0 and M0a for each detection. Accordingly, the number of point clouds M0 and M0a can be increased while noise is removed from the detection result, and thus the accuracy of determining the position and attitude of the obstacle P can be increased. Further, because point clouds other than those suitable for determining the position and attitude of the obstacle P are excluded, calculation amount and calculation load can be reduced.

Note that the determination result of the position and attitude of the obstacle P may be shared between a plurality of movable bodies. That is, in the present embodiment, the movable body 10 determines by itself the position and attitude of the obstacle P. However, for example, when the position and attitude of the obstacle P has been determined by another movable body or the like, the information about the determined position and attitude of the obstacle P may be acquired to generate the avoidance path R2. In that case, a control device of a movable body transmits the determination result of the positions and attitudes of the front surface Pa and the side surface Pb of the obstacle P to the information processing device 12 or an external device such as another movable body. Then, in generating the avoidance path R2, the movable body acquires the determination result of the position and attitude of the obstacle P from the information processing device 12 or another movable body to generate the avoidance path R2. By sharing the determination result of the position and attitude of the obstacle P as described above, calculation for determining the position and attitude of the obstacle P in generating the avoidance path R2 becomes unnecessary, and calculation load can be reduced. Further, decreasing the movement speed for detecting the obstacle P is also unnecessary, and thus work efficiency can be improved.

Furthermore, in the present embodiment, the control device 28 of the movable body 10 determines the position and attitude of the front surface Pa from the detection result by the sensor 26, generates the avoidance path R2 based on the position and attitude of the front surface Pa, determines the position and attitude of the side surface Pb from the detection result by the sensor 26 during movement along the avoidance path R2, and updates the avoidance path R2 based on the position and attitude of the side surface Pb. However, the above processing is not limited to being executed by the movable body 10, and, for example, at least part of the above processing may be executed by another device such as the information processing device 12, and the movable body 10 may acquire the result thereof. That is, for example, the obstacle information acquisition unit 76 of the movable body 10 may acquire the determination result of the position and attitude of the front surface Pa determined based on the detection result of the obstacle P, or may determine by itself the position and attitude of the front surface Pa, or may acquire the determination result of the position and attitude of the front surface Pa from an external device. Further, for example, the avoidance path information acquisition unit 78 of the movable body 10 may acquire the information about the avoidance path R2 generated based on the determination result of the position and attitude of the front surface Pa, or may generate by itself the avoidance path R2, or may acquire the information about the avoidance path R2 from an external device. When the avoidance path information acquisition unit 78 acquires the information about the avoidance path R2 from an external device, the movable body 10 is no longer required to execute the process of generating the avoidance path R2 based on the position and attitude of the front surface Pa, and thus it can be said that there is no need to acquire the determination result of the position and attitude of the front surface Pa. For example, the obstacle information acquisition unit 76 of the movable body 10 may acquire the determination result of the position and attitude of the side surface Pb determined based on the detection result during movement along the avoidance path R2, or may determine by itself the position and attitude of the side surface Pb, or may acquire the determination result of the position and attitude of the side surface Pb from an external device. Further, for example, the avoidance path information acquisition unit 78 of the movable body 10 may acquire the information about the avoidance path R2 updated based on the determination result of the position and attitude of the side surface Pb, or may update by itself the avoidance path R2, or may acquire the information about the updated avoidance path R2 from an external device. When the avoidance path information acquisition unit 78 acquires the information about the updated avoidance path R2 from an external device, the movable body 10 is no longer required to execute the process of updating the avoidance path R2 based on the position and attitude of the side surface Pb, and thus it can be said that there is no need to acquire the determination result of the position and attitude of the side surface Pb.

Second Embodiment

Next, a second embodiment will be described. The second embodiment differs from the first embodiment in that, in initially generating the avoidance path R2, there is a process of determining whether the first direction (an avoidance direction) is the direction Y1 or the direction Y2. In the second embodiment, the description of parts having the same configuration as those in the first embodiment will be omitted.

The avoidance path information acquisition unit 78 according to the second embodiment sets the first direction based on the position of the front surface Pa of the obstacle P determined by the obstacle information acquisition unit 76 and the boundary line of the travelable region RE. More specifically, the avoidance path information acquisition unit 78 estimates the position of the side surface Pb of the obstacle P based on the distance between the determined position of the front surface Pa of the obstacle P and the boundary line of the travelable region RE. In other words, the avoidance path information acquisition unit 78 determines whether the first direction of the avoidance path R2 to be initially set is the direction Y1 or the direction Y2 based on the distance between the position of the front surface Pa of the obstacle P and the boundary line of the travelable region RE, and sets the estimated position of the side surface Pb of the obstacle P so that the determination result can be taken into account. The specific description will be given below. Here, the boundary line of the travelable region RE refers to a line that separates the inside and the outside of the travelable region RE, and can also be referred to as an outer edge of the travelable region RE.

Figure 19:
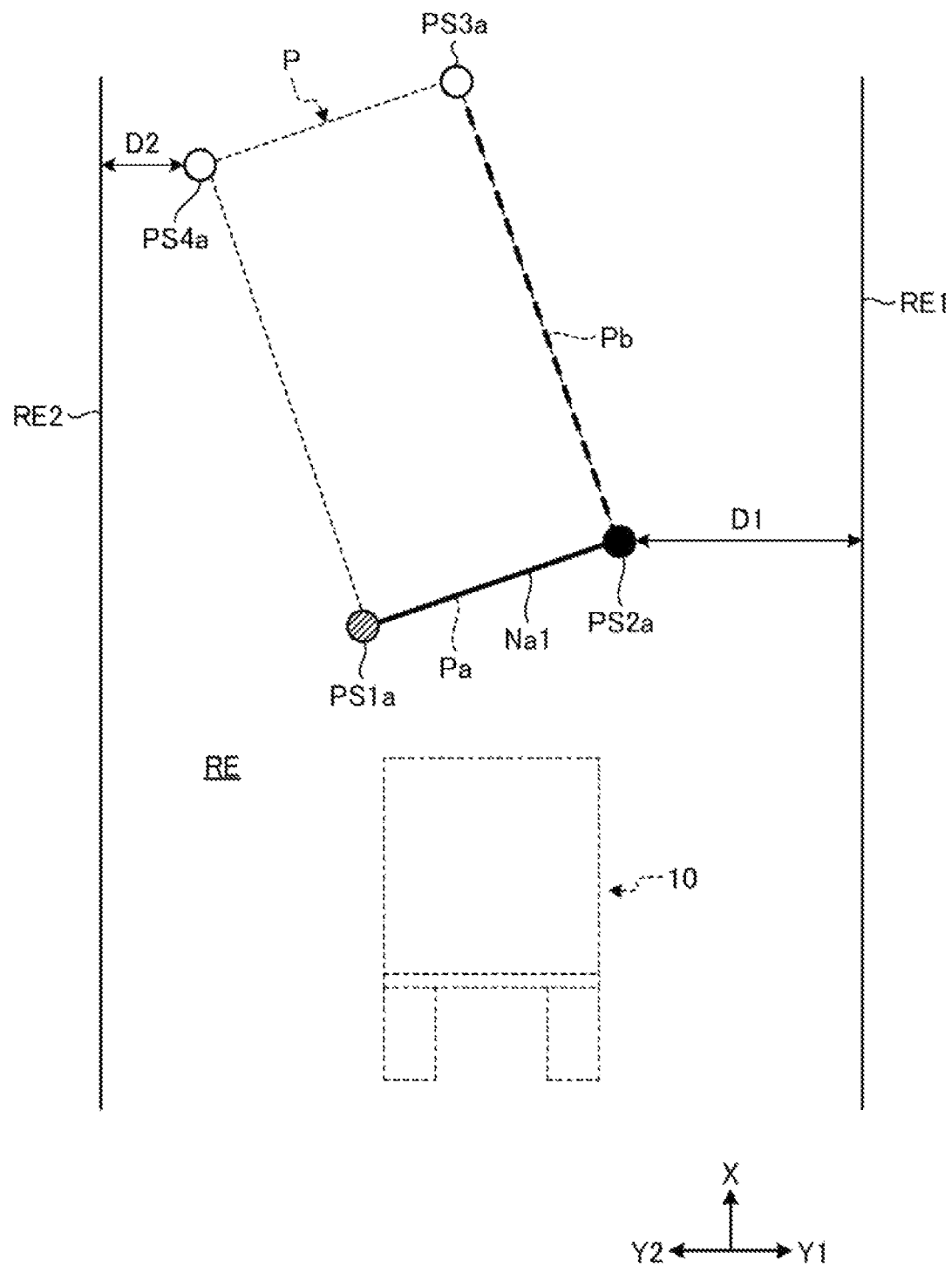
FIG. 19 is a schematic view for describing a method of estimating a position of a side surface of an obstacle according to a second embodiment.
Figure 20:
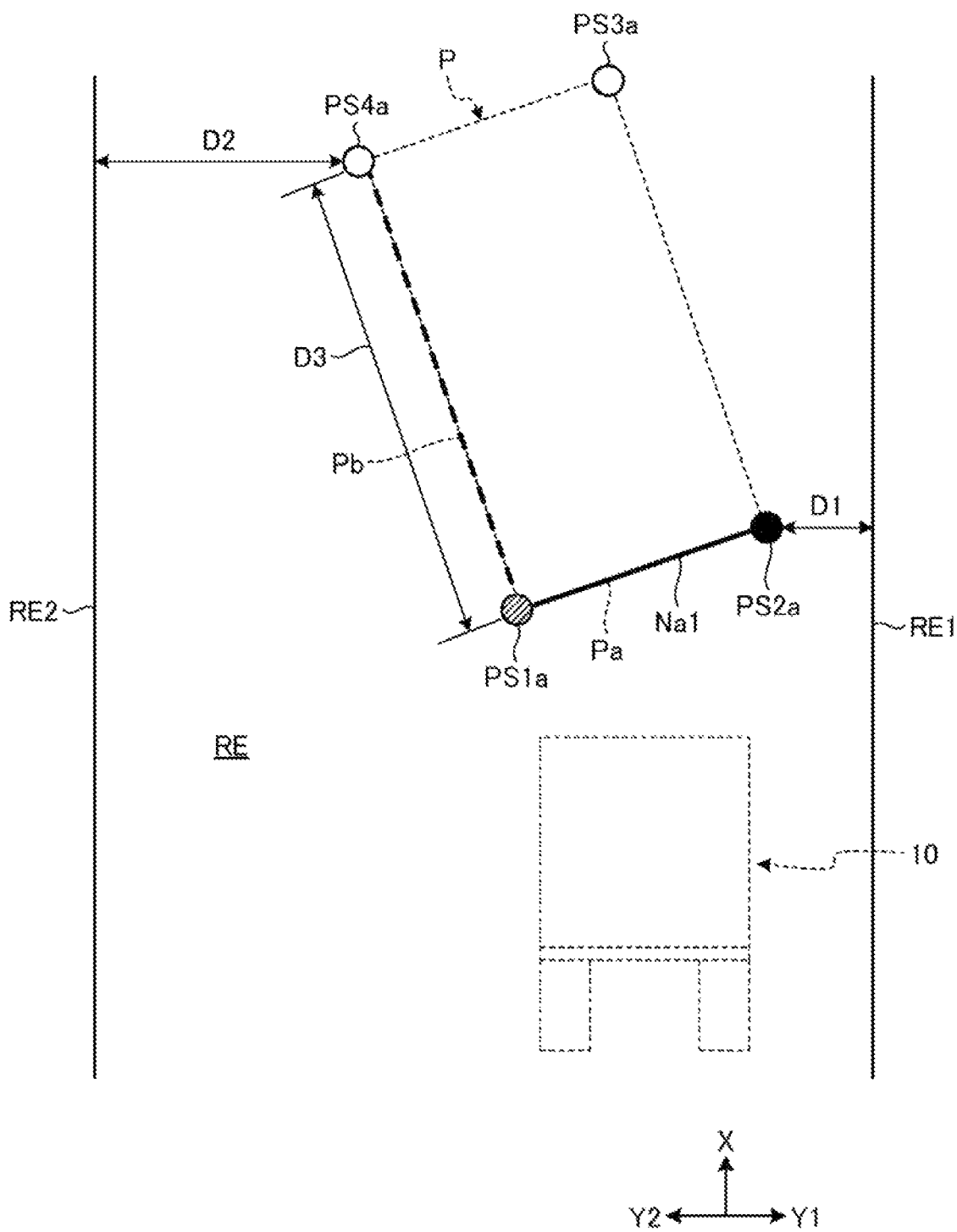
FIG. 20 is a schematic view for describing a method of estimating a position of a side surface of an obstacle according to a second embodiment.

FIGS. 19 and 20 are schematic views for describing a method of estimating the position of the side surface of an obstacle according to the second embodiment. The avoidance path information acquisition unit 78 according to the second embodiment determines one of the determined end points PS1$a$ and PS2$a$ of the front surface Pa (the line segment Na1) that is farther from the movable body 10 on the movement path R1, that is, the end point on the travel direction side (the X direction side) of the movement path R1, as a first end point that is a reference point. Further, among the end points PS1$a$ and PS2$a$, the end point that is not the first end point, that is, the end point on a side opposite to the travel direction of the movement path R1 is determined as a second end point. The avoidance path information acquisition unit 78 calculates a distance D1 between the first endpoint and a boundary line of the travelable region RE on a side in a direction heading from the second end point to the first end point (a boundary line on the first end point side), and determines whether the distance D1 is equal to or greater than a predetermined threshold value. In the following, the case where the end point PS2$a$ is the first end point and the end point PS1$a$ is the second end point will be described as an example. In this case, the avoidance path information acquisition unit 78 calculates the distance between the end point PS2$a$ that is the first end point and a boundary line RE1 of the travelable region RE on the direction Y1 side (the first end point side) as the distance D1, and determines whether the distance D1 is equal to or greater than a predetermined threshold value. The threshold value may be set arbitrarily, and may be a value obtained by adding a predetermined margin to the length of the movable body 10 in a lateral direction (a width direction), for example.

Distance D1 Equal to or Greater Than Threshold Value

FIG. 19 is a schematic view in the case where the distance D1 is equal to or greater than a threshold value. When the distance D1 is equal to or greater than a threshold value, the avoidance path information acquisition unit 78 sets the estimated position of the rear end point of the obstacle P on the second end point side so that a distance D2 from the rear end point on the second end point side to the boundary line of the travelable region RE on the second end point side is a predetermined value. Here, the rear end point on the second end point side refers to one of both end points of the rear surface of the obstacle P that is located on a side in a direction heading from the first end point to the second end point. Further, the boundary line of the travelable region RE on the second end point side refers to a boundary line of the travelable region RE on a side in a direction heading from the second end point to the first end point. Accordingly, in the example illustrated in FIG. 19, the avoidance path information acquisition unit 78 sets the estimated position of a rear end point PS4$a$, which is a rear end point on the second end point side, so that the distance D2 from the rear end point PS4$a$ to a boundary line RE2 on the direction Y2 side (the second end point side) is a first predetermined value. Here, the first predetermined value is preferably a value less than the threshold value described above, and is preferably a value less than the length of the movable body 10 in the lateral direction (the width direction).

After the estimated position of the rear end point on the second end point side is set, the avoidance path information acquisition unit 78 sets the estimated position of a rear end point on the first end point side based on the position of the first end point, the position of the second end point, and the estimated position of the rear end point on the second end point side. The rear end point on the first end point side refers to one of the both end points of the rear surface of the obstacle P that is not the rear end point on the second end point side, and can be said to refer to an end point on the side in the direction heading from the second end point to the first end point. For example, the avoidance path information acquisition unit 78 sets a position separated from the rear end point on the second end point side by the length and in the direction of a line segment N 1$a$ connecting the second end point and the first end point, as the rear end point on the first end point side. The avoidance path information acquisition unit 78 calculates the estimated position of the side surface Pb of the obstacle P based on the position of the first end point, the position of the second end point, and the estimated position of the rear end point. In the example in FIG. 19, the avoidance path information acquisition unit 78 calculates the position of the rear end point PS3$a$ as the rear end point on the first end point side, and determines a line segment connecting the rear end point PS3$a$ and the end point PS2$a$ as the estimated position of the side surface Pb.

The avoidance path information acquisition unit 78 generates the avoidance path R2 such that the movable body 10 is located within the range of the travelable region RE while avoiding the front surface Pa (the line segment Na1) and the estimated position of the side surface Pb of the obstacle P. When the distance D1 is equal to or greater than the threshold value as in FIG. 19, the distance D2 from the rear end point PS4$a$ to the boundary line RE2 is set as the first predetermined value that is less than the threshold value. For this reason, there is a possibility that the movable body 10 cannot pass between the rear end point PS4$a$ and the boundary line RE2, and thus the avoidance path information acquisition unit 78 generates the avoidance path R2 using the direction Y1 as the first direction (the avoidance direction), instead of generating the avoidance path R2 using the direction Y2, which is a direction for passing between the rear end point PS4$a$ and the boundary line RE2, as the first direction. That is, when the distance D1 between the first end point and the boundary line on the first end point side is equal to or greater than the threshold value, the avoidance path information acquisition unit 78 sets the distance D2 between the rear end point PS4$a$ on the second end point side and the boundary line RE2 to be short, and thereby prevents the direction Y2 (a direction on the second end point side) from being selected as the first direction, and selects the direction Y1 (the first end point side) as the first direction. In this way, when the distance D1 between the first end point and the boundary line on the first end point side is equal to or greater than the threshold value, the avoidance path information acquisition unit 78 can be said to set the direction heading from the second end point to the first end point as the first direction of the avoidance path R2.

Distance D1 Less Than Threshold Value

FIG. 20 is a schematic view in the case where the distance D1 is less than a threshold value. When the distance D1 is less than a threshold value, the avoidance path information acquisition unit 78 sets the estimated position of the rear end point on the second end point side such that a length D3 from the second end point to the rear end point on the second end point side is a second predetermined value. Note that the second predetermined value may be set to any value, and, for example, may be set based on a length from the first end point to the second end point (the length of the front surface Pa), or may bet set to twice the length from the first end point to the second end point. Accordingly, in the example illustrated in FIG. 20, the avoidance path information acquisition unit 78 sets the estimated position of the rear end point PS4$a$ such that the length D3 from the end point PS1$a$, which is the second end point, to the rear end point PS4$a$, which is a rear end point on the second end point side, is the second predetermined value. However, when the distance D2 between the estimated position of the rear end point PS4$a$ (the rear end point on the second end point side) set as described above and the boundary line RE2 on the second end point side is less than the threshold value, the avoidance path information acquisition unit 78 may reset the estimated position of the rear end point PS4$a$ (the rear end point on the second end point side) such that the distance D2 is equal to or greater than the threshold value, or more preferably equal to the threshold value.

After the estimated position of the rear end point on the second end point side is set, the avoidance path information acquisition unit 78 sets the estimated position of the rear end point on the first end point side based on the position of the first end point, the position of the second end point, and the estimated position of the rear end point on the second end point side. The avoidance path information acquisition unit 78 calculates the estimated position of the side surface Pb of the obstacle P based on the position of the first end point, the position of the second end point, and the estimated position of the rear end point. In the example in FIG. 19, the avoidance path information acquisition unit 78 determines a line segment connecting the rear end point PS4$a$ and the end point PS1$a$ as the estimated position of the side surface Pb.

The avoidance path information acquisition unit 78 generates the avoidance path R2 such that the movable body 10 is located within the range of the travelable region RE while avoiding the front surface Pa (the line segment Na1) and the estimated position of the side surface Pb of the obstacle P. When the distance D1 between the end point PS2$a$ and the boundary line RE1 is less than the threshold value as in FIG. 20, there is a possibility that the movable body 10 cannot pass between the end point PS2$a$ and the boundary line RE1.

Meanwhile, when the distance D1 is less than the threshold value, the distance D2 from the rear end point PS4a to the boundary line RE2 is set to a value equal to or greater than the threshold value. Accordingly, the avoidance path information acquisition unit 78 generates the avoidance path R2 using the direction Y2 as the first direction (the avoidance direction), instead of generating the avoidance path R2 using the direction Y1, which is a direction for passing between the end point PS2a and the boundary line RE1, as the first direction. That is, when the distance D1 between the first end point and the boundary line on the first end point side is less than the threshold value, the avoidance path information acquisition unit 78 sets the distance D2 between the rear end point PS4a on the second end point side and the boundary line RE2 to be long, and thereby prevents the direction Y1 (a direction on the first end point side) from being selected as the first direction, and selects the direction Y2 (the second end point side) as the first direction. In this way, when the distance D1 between the first end point and the boundary line on the first end point side is less than the threshold value, the avoidance path information acquisition unit 78 can be said to set the direction heading from the first end point to the second end point as the first direction of the avoidance path R2.

In this way, in the second embodiment, the first direction of the avoidance path R2 is set based on the position of the front surface Pa of the obstacle P and the boundary line of the travelable region RE. Usually, after the front surface Pa of the obstacle P is avoided, there is no possibility of contact with the side surface Pb of the obstacle P. Thus, for example, when the distance to the boundary line of the travelable region RE is equal to or greater than the threshold value, it can be said that it is more likely to be safer to select the path on that side. Thus, by setting the first direction of the avoidance path R2 based on the position of the front surface Pa of the obstacle P and the boundary line of the travelable region RE as in the second embodiment, it is possible to select an avoidance direction with less risk of contact with the obstacle P and generate a safer avoidance path.

As in the above description, when the distance between the end point PS1a and the end point PS2a in the travel direction of the movement path R1 is less than the predetermined distance, in other words, when the inclination of the front surface Pa (the line segment Na1) with respect to the direction orthogonal to the travel direction of the movement path R1 is less than the predetermined angle, the estimated position of the side surface Pb may be calculated as follows without calculating the estimated position of the side surface Pb. That is, when the distance between the end point PS1a and the end point PS2a in the travel direction of the movement path R1 is less than a predetermined distance, the estimated positions of the rear end points PS3a and PS4a are calculated such that the distance from the end point PS1a to the rear end point PS4a is the second predetermined value and the distance from the end point PS2a to the rear end point PS3a is the second predetermined value. Then, a line segment connecting the end point PS1a and the estimated position of the rear end point PS4a and a line segment connecting the end point PS2a and the estimated position of the rear end point PS3a are calculated as the estimated position of the side surface Pb. The avoidance path information acquisition unit 78 generates the avoidance path R2 in the same manner as in the first embodiment based on the estimated position of the side surface Pb.

Processing Flow

Figure 21:
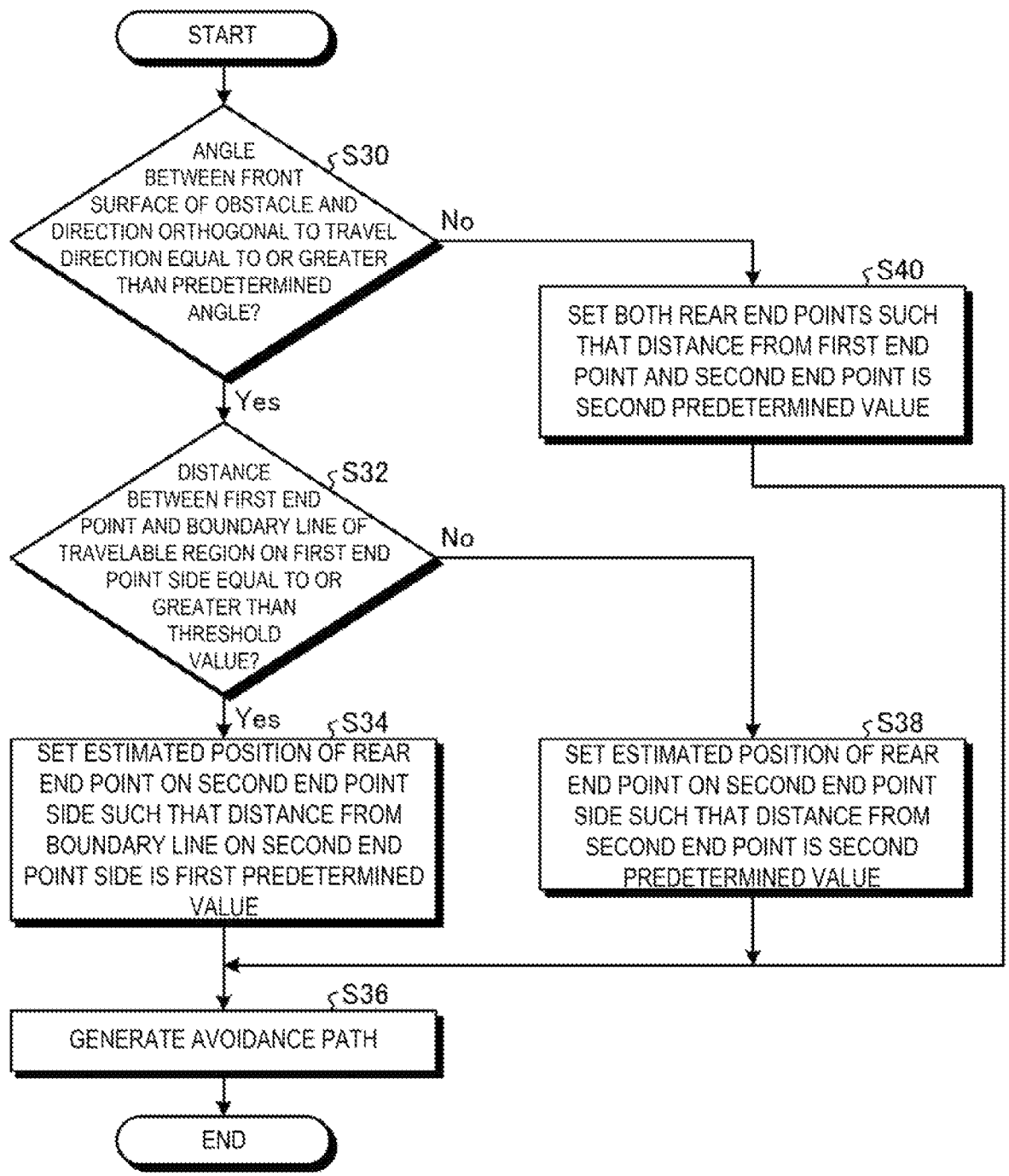
FIG. 21 is a flowchart for describing an avoidance path generation flow according to a second embodiment.

Next, a processing flow of an avoidance path generation method according to the second embodiment will be described. FIG. 21 is a flowchart for describing an avoidance path generation flow according to the second embodiment. As illustrated in FIG. 21, the avoidance path information acquisition unit 78 determines whether an angle formed between the front surface Pa (the line segment Nat) of the obstacle P and a direction orthogonal to the travel direction of the movement path R1 is equal to or greater than a predetermined angle (step S30). That is, the avoidance path information acquisition unit 78 determines the degree of inclination of the obstacle P. When the angle is equal to or greater than the predetermined angle (step S30; Yes), the avoidance path information acquisition unit 78 determines whether the distance D1 between the boundary line RE1 of the travelable region RE on the first direction side and the end point PS2a, which is the first end point, is equal to or greater than the threshold value (step S32). When the distance D1 is equal to or greater than the threshold value (step S32; Yes), the avoidance path information acquisition unit 78 sets the estimated position of the rear end point PS4a on the second end point side such that the distance D2 from the estimated position of the rear end point PS4a on the second end point side to the boundary line RE2 on the second end point side is the first predetermined value (step S34). The avoidance path information acquisition unit 78 calculates the estimated position of the side surface Pb based on the estimated position of the rear end point PS4a to generate the avoidance path R2 (step S36).

On the other hand, when the distance D1 is less than the threshold value (step S32: No), the avoidance path information acquisition unit 78 sets the estimated position of the rear end point PS4a on the second end point side such that the length D3 from the estimated position of the rear end point PS4a on the second end point side to the end point PS1a, which is the second end point, is the second predetermined value (step S38). The avoidance path information acquisition unit 78 calculates the estimated position of the side surface Pb based on the estimated position of the rear end point PS4a to generate the avoidance path R2 (step S36).

Further, when the angle formed between the front surface Pa (the line segment Na1) of the obstacle P and a direction orthogonal to the travel direction of the movement path R1 is less than the predetermined angle (step S30: No), the avoidance path information acquisition unit 78 sets the estimated positions of the rear end points PS3a and PS4a such that the distance from the estimated positions of the rear end points PS3a and PS4a to the first end point and the second end point (the end points PS1a and PS2a) is the second predetermined value (step S40). The avoidance path information acquisition unit 78 calculates the estimated position of the side surface Pb based on the estimated positions of the rear end points PS3a and PS4a to generate the avoidance path R2 (step S36).

Effects of the Present Disclosure

As described above, the control method according to the present disclosure is a method for controlling the movable body 10 that moves automatically and includes: the step of causing the sensor 26 provided on the movable body 10 to detect the obstacle P; the step of determining the position and attitude of the front surface Pa of the obstacle P opposite to the travel direction of the movable body 10 based on the detection result of the obstacle P; the step of generating the avoidance path R2 that avoids the obstacle P while heading toward the side of the first direction intersecting the travel direction based on the position and attitude of the front surface Pa; the step of causing the movable body 10 to move along the avoidance path R2; the step of detecting the obstacle P while the movable body 10 is moving along the avoidance path R2; the step of determining the position and attitude of the side surface Pb of the obstacle P on the side of the first direction based on the detection result obtained during movement along the avoidance path R2; and the step of updating the avoidance path R2 so as to return to the side of the second direction opposite to the first direction while avoiding the obstacle P based on the position and attitude of the side surface Pb. According to the present control method, because the avoidance path R2 is updated by determining the side surface Pb, the avoidance path R2 can be updated so as to appropriately avoid collision with the side surface Pb, allowing appropriate avoidance of the obstacle P.

In the step of updating the avoidance path R2, the avoidance path R2 is updated such that the position in the second direction of the movement path R1 used before switching to the avoidance path R2 and the position in the second direction of the end point of the avoidance path R2 overlap with each other. In this way, by aligning the position of the end point of the avoidance path R2 in the second direction with the movement path R1, it is possible to avoid the obstacle P in the avoidance path R2 and then smoothly switch to the movement path R1 to continue the movement.

In the step of detecting the obstacle P, the sensor 26 detects the obstacle P a plurality of times, and the plurality of detection results by the sensor 26 are acquired as the point cloud M0. Then, in the step of determining the position and attitude of the front surface Pa, the point cloud M0 corresponding to the plurality of detection results by the sensor 26 is superimposed in the same coordinate system, and the position and attitude the front surface Pa are determined based on the position of the superimposed point cloud M0. According to the present control method, by superimposing the point cloud M0, the number of the point clouds M0 can be increased, and thus the accuracy of determining the position and attitude of the obstacle P can be increased.

In the step of determining the position and attitude of the front surface Pa, the approximate line Na of the superimposed point cloud M0 is calculated, the superimposed point cloud M0 is projected onto the approximate line Na to convert the point cloud M0 in the same coordinate system into the point cloud M0 in the coordinate system of the approximate line Na, the position of the front surface Pa is determined based on the position of the point cloud M0 in the coordinate system of the approximate line Na, and the attitude of the front surface Pa is determined based on the approximate line Na. According to the present control method, by using the approximate line Na and the point cloud M0 in the coordinate system of the approximate line Na in this manner, it is possible to increase the accuracy of determining the position and attitude of the obstacle P.

In the step of determining the position and attitude of the front surface Pa, the straight line La corresponding to the front surface Pa is calculated based on the point cloud M0 obtained by at least one detection, and the point cloud M0 to be superimposed in the same coordinate system is extracted based on the positional relationship between the straight line La and the point cloud M0. According to the present control method, by extracting the point cloud M0 used to determine the front surface Pa in this manner, noise can be removed from the detection result, and the accuracy of determining the position and attitude of the obstacle P can be increased. Further, calculation amount and calculation load can be reduced.

The present control method further includes a step of outputting the determination result of the position and attitude of the front surface Pa and the determination result of the position and attitude of the side surface Pb to a device other than the movable body 10. According to the present control method, because the determination result of the position and attitude of the obstacle P can be shared with another movable body, calculation for determining the position and attitude of the obstacle P in generating the avoidance path R2 becomes unnecessary, and calculation load can be reduced. Further, decreasing the movement speed for detecting the obstacle P is also unnecessary, and thus work efficiency can be improved.

In the step of generating the avoidance path R2, the first direction is set based on the travelable region RE in which the movable body 10 can move and the position of the front surface Pa. According to the present control method, by setting the first direction, which is the avoidance direction, in this manner, it is possible to generate the avoidance path R2 that can appropriately avoid the obstacle P.

In the step of generating the avoidance path R2, when the distance D1 between the first end point and the boundary line RE1 of the travelable region RE on the side of a direction intersecting the travel direction and heading from an other end point (the second end point) to one end point (the first end point) of the front surface Pa is equal to or greater than the threshold value, the direction heading from the second end point to the first end point of the front surface Pa is set as the first direction. On the other hand, when distance D1 between the first end point and the boundary line RE1 is less than the threshold value, a direction heading from the first end point to the second end point is set as the first direction. According to the present control method, by setting the first direction, which is the avoidance direction, in this manner, it is possible to generate the avoidance path R2 that can appropriately avoid the obstacle P.

The movable body 10 according to the present disclosure moves automatically and includes: the detection control unit 74 causing the sensor 26 provided on the movable body 10 to detect the obstacle P; the avoidance path information acquisition unit 78 acquiring the information about the avoidance path R2 that is generated based on the position and attitude of the front surface Pa opposite to the travel direction of the movable body 10 determined from the detection result of the obstacle P, and that avoids the obstacle P while heading toward the side of the first direction intersecting the travel direction; and the movement control unit 72 causing the movable body 10 to move along the avoidance path R2. The position and attitude of the side surface Pb of the obstacle P on the first direction side are determined based on the detection result of the obstacle P by the sensor 26 obtained during movement along the avoidance path R2, and the avoidance path R2 is updated based on the position and attitude of the side surface Pb so as to return to the second direction side while avoiding the obstacle P. The avoidance path R2 is updated so as to appropriately avoid collision with the side surface Pb, and thus the movable body 10 can appropriately avoid the obstacle P.

The program according to the present disclosure is a program that causes a computer to implement the method for controlling the movable body 10 that moves automatically and causes a computer to perform: the step of causing the sensor 26 provided on the movable body 10 to detect the obstacle P; the step of determining the position and attitude of the front surface Pa of the obstacle P opposite to the travel direction of the movable body 10 based on the detection result of the obstacle P; the step of generating the avoidance path R2 that avoids the obstacle P while heading toward the side of the first direction intersecting the travel direction based on the position and attitude of the front surface Pa; the step of causing the movable body 10 to move along the avoidance path R2; the step of detecting the obstacle P while the movable body 10 is moving along the avoidance path R2; the step of determining the position and attitude of the side surface Pb of the obstacle P on the side of the first direction based on the detection result obtained during movement along the avoidance path R2; and the step of updating the avoidance path R2 to return to the side of the second direction opposite to the first direction while avoiding the obstacle P based on the position and the attitude of the side surface Pb. According to the present program, because the avoidance path R2 is updated by determining the side surface Pb, the avoidance path R2 can be updated so as to appropriately avoid collision with the side surface Pb, allowing appropriate avoidance of the obstacle P.

The embodiment of the disclosure is described above, but the embodiment is not limited by the details of the embodiment above. Further, the constituent elements described above include elements that are able to be easily conceived by a person skilled in the art, and elements that are substantially the same, that is, elements of an equivalent scope. Furthermore, the constituent elements described above can be appropriately combined. Further, it is possible to make various omissions, substitutions, and changes to the constituent elements within a range not departing from the scope of the above-described embodiment.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A method of controlling a movable body that moves automatically, the method comprising:
   a step of causing a sensor provided on the movable body to detect an obstacle;
   a step of determining a position and an attitude of a front surface, of the obstacle, opposite to a travel direction of the movable body based on a detection result of the obstacle;
   a step of generating an avoidance path that avoids the obstacle while heading toward a side of a first direction intersecting the travel direction based on the position and the attitude of the front surface;
   a step of causing the movable body to move along the avoidance path;
   a step of detecting the obstacle while the movable body is moving along the avoidance path;
   a step of determining a position and an attitude of a side surface of the obstacle on the side of the first direction based on a detection result obtained during movement along the avoidance path; and
   a step of updating the avoidance path to return to a side of a second direction opposite to the first direction while avoiding the obstacle based on the position and the attitude of the side surface,
   wherein in the step of causing the sensor to detect the obstacle, the sensor is caused to perform detection of the obstacle a plurality of times, and detection results of the plurality of times of the detection by the sensor are obtained as a point cloud, and
   wherein in the step of determining the position and the attitude of the front surface, the point cloud corresponding to the detection results of the plurality of times of the detection by the sensor is superimposed in a same coordinate system, an approximate line of the point cloud superimposed is calculated, the point cloud superimposed is projected onto the approximate line to convert the point cloud in the same coordinate system into a point cloud in a coordinate system of the approximate line, the position of the front surface is determined based on a position of the point cloud in the coordinate system of the approximate line, and the attitude of the front surface is determined based on the approximate line.

2. The method of controlling the movable body according to claim 1, wherein, in the step of updating the avoidance path, the avoidance path is updated such that a position in the second direction of a movement path used before switching to the avoidance path and a position in the second direction of an end point of the avoidance path overlap with each other.

3. The method of controlling the movable body according to claim 1, wherein, in the step of determining the position and the attitude of the front surface, a straight line corresponding to the front surface is calculated based on the point cloud obtained by at least one detection, and a point cloud to be superimposed in the same coordinate system is extracted based on a positional relationship between the straight line and the point cloud.

4. The method of controlling the movable body according to claim 3, wherein, in the step of determining the position and the attitude of the front surface, the point cloud located within a predetermined range of distance from the straight line is extracted as the point cloud to be superimposed in the same coordinate system.

5. The method of controlling the movable body according to claim 1, further comprising a step of outputting a determination result of the position and the attitude of the front surface and a determination result of the position and the attitude of the side surface to a device other than the movable body.

6. The method of controlling the movable body according to claim 1, wherein, in the step of generating the avoidance path, the first direction is set based on a travelable region in which the movable body can move and the position of the front surface, and the avoidance path is generated to avoid the obstacle while heading to the first direction set.

7. The method of controlling the movable body according to claim 6, wherein, in the step of generating the avoidance path,
   when a distance between a boundary line of the travelable region on a side of a direction intersecting the travel direction and heading from an other end point to one end point of the front surface and the one end point is equal to or greater than a threshold value, the direction heading from the other end point to the one end point of the front surface is set as the first direction, and
   when the distance between the boundary line and the one end point is less than the threshold value, a direction heading from the one end point to the other end point is set as the first direction.

8. A movable body that moves automatically, comprising:
   a detection control unit configured to cause a sensor provided on the movable body to detect an obstacle;
   an avoidance path information acquisition unit configured to acquire information about an avoidance path, the avoidance path being generated based on a position and an attitude of a front surface, of the obstacle, opposite to a travel direction of the movable body, the position and the attitude of the front surface being determined by a detection result of the obstacle, the avoidance path avoiding the obstacle while heading to a first direction intersecting the travel direction; and a movement control unit configured to cause the movable body to move along the avoidance path, the avoidance path being configured to be updated based on a position and an attitude of a side surface of the obstacle on the side of the first direction to return to a side of a second direction opposite to the first direction while avoiding the obstacle, the position and the attitude of the side surface being determined based on a detection result of the obstacle obtained by the sensor during movement along the avoidance path, wherein the detection control unit causes the sensor to perform detection of the obstacle a plurality of times, and detection results of the plurality of times of the detection by the sensor are obtained as a point cloud, and wherein the avoidance path information acquisition unit superimposes the point cloud corresponding to the detection results of the plurality of times of the detection by the sensor in a same coordinate system, calculates an approximate line of the point cloud superimposed, projects the point cloud superimposed onto the approximate line to convert the point cloud in the same coordinate system into a point cloud in a coordinate system of the approximate line, determines the position of the front surface based on a position of the point cloud in the coordinate system of the approximate line, and determines the attitude of the front surface based on the approximate line.

9. A non-transitory computer readable storage medium storing a program causing a computer to implement a method of controlling a movable body that moves automatically, the method causing the computer to perform:

a step of causing a sensor provided on the movable body to detect an obstacle;

a step of determining a position and an attitude of a front surface, of the obstacle, opposite to a travel direction of the movable body based on a detection result of the obstacle;

a step of generating an avoidance path that avoids the obstacle while heading toward a side of a first direction intersecting the travel direction based on the position and the attitude of the front surface;

a step of causing the movable body to move along the avoidance path;

a step of detecting the obstacle while the movable body is moving along the avoidance path;

a step of determining a position and an attitude of a side surface of the obstacle on the side of the first direction based on a detection result obtained during movement along the avoidance path; and a step of updating the avoidance path to return to a side of a second direction opposite to the first direction while avoiding the obstacle based on the position and the attitude of the side surface, wherein in the step of causing the sensor to detect the obstacle, the sensor is caused to perform detection of the obstacle a plurality of times, and detection results of the plurality of times of the detection by the sensor are obtained as a point cloud, and wherein in the step of determining the position and the attitude of the front surface, the point cloud corresponding to the detection results of the plurality of times of the detection by the sensor is superimposed in a same coordinate system, an approximate line of the point cloud superimposed is calculated, the point cloud superimposed is projected onto the approximate line to convert the point cloud in the same coordinate system into a point cloud in a coordinate system of the approximate line, the position of the front surface is determined based on a position of the point cloud in the coordinate system of the approximate line, and the attitude of the front surface is determined based on the approximate line.

* * * * *